(12) United States Patent
Shen et al.

(10) Patent No.: US 12,058,479 B2
(45) Date of Patent: Aug. 6, 2024

(54) FULL COLOR SPECTRUM BLENDING AND DIGITAL COLOR FILTERING FOR TRANSPARENT DISPLAY SCREENS

(71) Applicant: Pathway Innovations and Technologies, Inc., San Diego, CA (US)

(72) Inventors: Ji Shen, San Diego, CA (US); Feng Gang Wu, San Diego, CA (US)

( * ) Notice: Subject to any disclaimer, the term of this patent is extended or adjusted under 35 U.S.C. 154(b) by 0 days.

(21) Appl. No.: 17/950,076

(22) Filed: Sep. 21, 2022

(65) Prior Publication Data

US 2023/0113359 A1    Apr. 13, 2023

Related U.S. Application Data

(63) Continuation-in-part of application No. 17/079,345, filed on Oct. 23, 2020, now abandoned.

(60) Provisional application No. 63/246,492, filed on Sep. 21, 2021.

(51) Int. Cl.
| | |
|---|---|
| *H04N 9/64* | (2023.01) |
| *G06T 11/00* | (2006.01) |
| *G06V 10/44* | (2022.01) |
| *G06V 30/18* | (2022.01) |
| *G09B 7/02* | (2006.01) |
| *H04N 23/56* | (2023.01) |
| *H04N 23/84* | (2023.01) |

(52) U.S. Cl.
CPC .......... *H04N 9/646* (2013.01); *G06T 11/001* (2013.01); *G06V 10/44* (2022.01); *G06V 30/1801* (2022.01); *H04N 23/56* (2023.01); *H04N 23/84* (2023.01); *G09B 7/02* (2013.01)

(58) Field of Classification Search
CPC ........ H04N 9/646; H04N 23/56; H04N 23/84; G06T 11/001; G06V 10/44; G06V 30/1801; G09B 7/02
See application file for complete search history.

(56) References Cited

U.S. PATENT DOCUMENTS

| | | | | |
|---|---|---|---|---|
| 4,565,430 A | * | 1/1986 | Grunwald ............ | G03B 21/132 353/66 |
| 5,025,314 A | * | 6/1991 | Tang ........................ | H04N 7/15 434/350 |
| 5,349,400 A | * | 9/1994 | Kaplan ................... | G03B 21/10 359/836 |
| 5,764,403 A | * | 6/1998 | Downing ............... | G11C 13/04 348/E13.055 |
| 6,008,800 A | * | 12/1999 | Pryor .................... | G06F 3/0304 345/173 |
| 6,179,426 B1 | * | 1/2001 | Rodriguez, Jr. ......... | H04N 5/74 353/69 |
| 6,188,493 B1 | * | 2/2001 | Esaki ....................... | H04N 1/46 358/1.9 |
| 6,520,646 B2 | * | 2/2003 | Rodriguez, Jr. ..... | H04N 9/3194 353/69 |

(Continued)

*Primary Examiner* — Benyam Ketema

(57) ABSTRACT

The present invention provides a display screen with an integrated video camera optimized to capture the display screen's information and a light source that injects colored light into the edge of the display screen. Additionally, the system comprises a color blending instrument to blend the primary colors of red, green, blue, and a combination thereof to create an unlimited variety of color combinations that are injected into the display screen.

18 Claims, 23 Drawing Sheets

(56) References Cited

U.S. PATENT DOCUMENTS

| | | | | |
|---|---|---|---|---|
| 6,540,366 B2* | 4/2003 | Keenan | F16M 11/048 | 353/79 |
| 6,545,670 B1* | 4/2003 | Pryor | G06F 3/0428 | 345/173 |
| 6,604,829 B2* | 8/2003 | Rodriguez, Jr. | G03B 21/60 | 348/E5.143 |
| 6,637,896 B2* | 10/2003 | Li | G03B 21/10 | 353/119 |
| 6,802,611 B2* | 10/2004 | Chu | H04N 1/19594 | 353/42 |
| 7,427,983 B1* | 9/2008 | Hildebrandt | H04N 1/00127 | 345/173 |
| 7,673,840 B2* | 3/2010 | Weber | F16M 11/10 | 248/292.13 |
| 7,710,391 B2* | 5/2010 | Bell | G06F 3/0425 | 345/158 |
| 7,832,694 B2* | 11/2010 | German | A47B 97/04 | 248/129 |
| 7,850,311 B2* | 12/2010 | Rodriguez, Jr. | G03B 21/10 | 353/69 |
| 8,103,057 B2* | 1/2012 | Kroeker | G06F 3/0425 | 382/209 |
| 8,179,382 B2* | 5/2012 | Hildebrandt | H04N 1/00347 | 345/174 |
| 8,355,038 B2* | 1/2013 | Robinson | G03B 21/62 | 348/14.03 |
| 8,488,042 B2* | 7/2013 | Robinson | H04N 7/144 | 348/14.05 |
| 8,508,751 B1* | 8/2013 | Shen | H04N 1/00559 | 358/1.1 |
| 8,570,357 B2* | 10/2013 | Tan | H04N 7/15 | 348/14.08 |
| 8,570,423 B2* | 10/2013 | Robinson | H04N 7/15 | 348/42 |
| 8,757,819 B2* | 6/2014 | MacDonald | F16M 11/18 | 353/74 |
| 8,842,096 B2* | 9/2014 | Nungester | G06F 3/0425 | 345/175 |
| 9,049,482 B2* | 6/2015 | Reichelt | G06T 11/00 | |
| 9,800,931 B1* | 10/2017 | Tangeland | H04N 21/4312 | |
| D809,600 S* | 2/2018 | Anderson | D19/113 | |
| 10,025,430 B2* | 7/2018 | Narikawa | G06F 3/03542 | |
| D864,296 S* | 10/2019 | Park | D19/113 | |
| 10,523,893 B2* | 12/2019 | Anderson | H04N 5/44504 | |
| 10,839,494 B2* | 11/2020 | McCaughan | G06T 5/005 | |
| 10,901,548 B2* | 1/2021 | Liu | G03B 17/54 | |
| 11,231,850 B1* | 1/2022 | Shen | G06F 3/045 | |
| 2001/0046035 A1* | 11/2001 | Vanderwerf | G03B 21/60 | 348/E5.137 |
| 2002/0021417 A1* | 2/2002 | Rodriguez, Jr. | H04N 9/3141 | 353/69 |
| 2002/0131024 A1* | 9/2002 | Keenan | F16M 11/048 | 353/79 |
| 2003/0123032 A1* | 7/2003 | Rodriguez, Jr. | G03B 21/60 | 353/74 |
| 2004/0165389 A1* | 8/2004 | Chang | H04N 9/3141 | 348/E5.143 |
| 2004/0232826 A1* | 11/2004 | Liu | C09K 11/08 | 313/503 |
| 2005/0110964 A1* | 5/2005 | Bell | G06F 3/0428 | 353/122 |
| 2005/0122484 A1* | 6/2005 | Rodriguez, Jr. | G03B 5/04 | 353/79 |
| 2008/0204437 A1* | 8/2008 | Jensen | G01J 1/02 | 345/207 |
| 2008/0316348 A1* | 12/2008 | Hallock | G03B 21/14 | 353/121 |
| 2010/0188474 A1* | 7/2010 | Robinson | G03B 17/54 | 348/E5.04 |
| 2010/0289903 A1* | 11/2010 | Farquharson | H04N 23/50 | 348/207.1 |
| 2011/0227876 A1* | 9/2011 | Ilmonen | G06F 3/0425 | 345/175 |
| 2011/0234746 A1* | 9/2011 | Saleh | G06F 3/04886 | 348/E7.083 |
| 2012/0081503 A1* | 4/2012 | Leow | H04N 7/142 | 348/E7.083 |
| 2012/0081611 A1* | 4/2012 | Tan | H04N 7/144 | 348/584 |
| 2012/0098806 A1* | 4/2012 | Samadani | G06F 3/048 | 345/207 |
| 2012/0171656 A1* | 7/2012 | Shen | G06F 1/169 | 345/173 |
| 2013/0135260 A1* | 5/2013 | Damhaug | G06F 3/0421 | 345/175 |
| 2013/0147711 A1* | 6/2013 | Njolstad | G06F 3/0425 | 345/158 |
| 2013/0176483 A1* | 7/2013 | Shen | H04N 1/00251 | 348/373 |
| 2013/0321686 A1* | 12/2013 | Tan | H04N 7/144 | 348/E5.022 |
| 2014/0317561 A1* | 10/2014 | Robinson | H04N 7/15 | 715/800 |
| 2015/0049165 A1* | 2/2015 | Choi | H04N 7/144 | 348/14.16 |
| 2015/0102993 A1* | 4/2015 | Gadjali | G06F 3/038 | 345/156 |
| 2016/0014403 A1* | 1/2016 | Stroetmann | G06F 1/1681 | 348/53 |
| 2016/0077670 A1* | 3/2016 | Short | G06F 3/167 | 345/175 |
| 2016/0210039 A1* | 7/2016 | Suggs | G06F 3/0425 | |
| 2017/0206828 A1* | 7/2017 | Lunsford | G06F 3/017 | |
| 2017/0309029 A1* | 10/2017 | Wang | G06T 7/13 | |
| 2017/0357330 A1* | 12/2017 | Lewis | G06F 3/042 | |
| 2019/0356878 A1* | 11/2019 | Anderson | H04N 5/72 | |
| 2020/0225787 A1* | 7/2020 | Shen | G06F 3/04883 | |
| 2020/0382681 A1* | 12/2020 | Smithwick | H04N 9/3179 | |
| 2021/0080763 A1* | 3/2021 | Sulai | G02F 1/1334 | |
| 2022/0044580 A1* | 2/2022 | Vyalykh | H04N 9/3141 | |
| 2022/0129108 A1* | 4/2022 | Shen | G06F 3/0425 | |
| 2022/0360755 A1* | 11/2022 | Shen | G06F 3/0425 | |
| 2022/0406209 A1* | 12/2022 | Anderson | H04N 7/142 | |

* cited by examiner

FULL COLOR SPECTRUM BLENDING AND DIGITAL COLOR FILTERING FOR TRANSPARENT DISPLAY SCREENS

This application is a continuation-in-part of and claims priority to U.S. patent application Ser. No. 17/079,345 filed on Oct. 23, 2020, entitled, "Capturing Audio and Visual Information On Transparent Display Screens;" and claims priority to U.S. Provisional Patent Application No. 63/246,492 filed on Sep. 21, 2021, the entire disclosures of all of which are incorporated by reference herein. This application is related to U.S. Design patent application Ser. No. 29/756,006 filed on Oct. 23, 2020, entitled, "Camera For Capturing Information on a Transparent Medium;" and U.S. Design patent application Ser. No. 29/768,320 filed on Jan. 28, 2021, entitled, "Hood For Writing Glass;" the entire disclosures of all of which are incorporated by reference herein.

BACKGROUND OF THE INVENTION

1. Field of Invention

The invention relates to capturing information on display screens.

2. Description of Related Art

Handwriting remains an indispensable tool for teaching and instruction, for example, for students in a classroom, professionals in a business meeting, scholars at a conference, or anyone who wants to convey information to an audience. Traditionally, when an instructor, teacher, or presenter writes on a surface, it is often a whiteboard with a dry-erase marker, a blackboard with chalk, an interactive digital panel display with a stylus or hand/finger gestures. The whiteboard, blackboard, or other surface is typically mounted or stationed along a room wall. For example, teachers will often lecture at the head of a room with a whiteboard mounted behind them. A significant drawback to this orientation is that it requires the teacher or presenter to turn their back to the audience to write on the display screen.

Injecting light into display screens, specifically on glass displays, creates a glowing effect that makes most writing on display screens shine brighter. This glowing effect is attractive to audiences and captures an audience's attention better than ink on a board—a critical factor in garnering learner engagement. Ultraviolet light and blue light generally make the fluorescent ink glow with the most intensity. However, a presenter must use writing instruments that require neon or fluorescent ink as other forms do not create as bright of a glowing effect.

While only white light, blue light, or predominately blue light color hues are commonly injected, numerous other color hues, including white and blue lights appear distorted and are uniformly blurred. Further, when light is injected, whether colored or not, a tint is created, which distorts the original writing color. These drawbacks and side-effects are due to the injected light reflecting off of the glass display.

Consequently, to eliminate an incorrect and distorted image and color hue, a physical filter is often required. The physical filter is often placed on a camera lens used to image the writing on the display screen. For the filter to be effective, it must match the specific light frequency range to reduce or attempt to eliminate any light distortion. Because the filter must match the particular light frequency, filters are only created for specific colors. However, physical color filters are expensive to make and creating a physical filter for each different color is impractical. A low-cost and versatile solution is to replace the physical filter with a digital filter and dynamically switch the digital filter that matches the frequency range of the injected light color range via software.

Furthermore, it is desirable to eliminate the need to use a corresponding marker for each different color and fluorescent markers or writing instruments all together by providing light in a digital manner. The glowing effect can be digitally enhanced or intensified after the writing is captured by a camera via a touch-enabled surface. Once writing is captured, virtually all light spectrums can be applied to create glowing ink effects.

It is useful to show and use multiple colors in writings and drawings in certain industries. For example, engineering, architectural, and artistic drawings are preferably created using multiple colors. Beneficially, when colored light featuring a multiplicity of colors is injected into a display, a user can create more colorful and clearer drawings on the board which better garners an audience's attention.

In light of these challenges in the field, there exists a need for injecting light on a full color spectrum with digital color filtering on a transparent display screen. This need has remained unsatisfied.

SUMMARY OF THE INVENTION

The present invention overcomes these and other deficiencies of the prior art by providing a display screen integrated with a video camera optimized to capture information on the display screen. A presenter writes or draws information on the display screen while facing an audience. The present invention does not require extraneous video production equipment or technical expertise to operate while providing a compact and easily transportable system.

In an embodiment of the invention, a device comprises: a display screen; a frame traversing at least a portion of a perimeter of the display screen; an extension comprising a distal end and a proximal end, wherein the proximal end of the extension is connected to the frame; and a video camera coupled to the extension. The frame comprises a light source injecting light into an edge of the display screen. The device may further comprise a stand coupled to the frame. The display screen comprises a first surface and a second surface opposite the first surface, and wherein the extension extends from the second surface. The video camera is coupled to the extension at the distal end and oriented in a direction toward the second surface. The display screen is transparent and comprises a material selected from the group consisting of: glass, acrylic, plexiglass, polycarbonate, cellophane, latex, polyurethane, melamine, vinyl, polyester, and any combination thereof.

In another embodiment of the present invention, a method for capturing visual information comprises the steps of: capturing, with a video camera coupled to an extension coupled to a display screen, information presented on the display screen; processing the captured information into processed information; and transmitting the processed information to a display. Processing the captured information comprises reorienting captured multimedia information about a vertical axis or superimposing a predetermined image or video. The method may further comprise injecting, from a light source in the frame, light into an edge of the display screen. The injected light is any colored light and processing the captured information comprises filtering the captured information of any unwanted light color, exposure, or other parameters.

In yet another embodiment of the invention, an apparatus comprises: a display screen; a frame traversing at least a portion of a perimeter of the display screen; an extension connected to the frame; a video camera coupled to the extension; at least one processor; and at least one memory including computer program code for one or more programs, the at least one memory and the computer program code configured to, with the at least one processor, cause the apparatus to perform at least the following, capturing, with the video camera, information presented on the display screen; processing the captured information; and transmitting the processed information to a display. The apparatus may further comprise a light source injecting light into an edge of the display screen. The injected light is any range of color hues. The extension is connected to the frame at a proximal end of the extension, and wherein the video camera is coupled to a distal end of the extension, the distal end is located opposite the proximal end. The display screen comprises a first surface and a second surface opposite the first surface, the extension extends from the second surface, and the video camera is oriented in a direction toward the second surface.

In another embodiment of the invention, a device comprises a light source to inject light using a combination of at least the three primary colors of red, green, and blue and a computer program that digitally filters the red, green, or blue color combination excess light. A computer program product digitally filters the unwanted light by using the camera's own image signal processor ("ISP") chip firmware or in a camera viewer application that matches a particular red, green, or blue color combination. More specifically, digitally filtering at the camera's image signal processor chip firmware occurs by filtering a frame of images that are captured or created by a camera. The implementation of the aforementioned digital filtering occurs as an alpha channel color blending or a total color adjustment.

Furthermore, in another embodiment of the invention, an apparatus does not need to use a physical light source but implements a computer program and code to digitally blend and create colors in real-time as a video is captured. The blending occurs by using the camera's own ISP chip firmware or in a camera viewer application by blending colors in a frame of images that are captured or created by a camera. Further, the present invention applies an image object recognition module and edge detection module. The apparatus allows a user to separate writing on the display screen. The modules convert visual information or writing on the display into vector data and subsequently apply digital re-coloring to the visual information on the display screen. Certain glowing effects are thus digitally created to better attract an audience's attention.

The present invention has many advantages over the prior art. For example, the present invention provides a "turn-key" solution to many problems experienced in the relevant art, i.e., easily implemented and requires little to no setup and adjustment before use. Various components of the present invention are pre-optimized to work together. The video camera is pre-configured to work seamlessly with the display screen by, for example, having an optimal focal length for use with the display screen, having filters pre-loaded or pre-installed, and by providing a fixed distance and angle from the display screen. Additionally, the display screen includes built-in lights that project a specific spectrum of light for the display screen's optimal illumination. These lights are also easily controlled by a built-in control panel while being pre-optimized to maximize visibility and legibility to a viewer. Such features remove all of the guesswork in setting up and provide a compact, lightweight, and easy transport package.

Additionally, the present invention advantageously blends a combination of the primary colors red, green, and blue to create an almost unlimited number of colors to better garner an audience's attention. Thus, eliminating the need for a physical glass or plastic color filter.

The foregoing and other features and advantages of the invention will be apparent from the following, more particular description of the invention's preferred embodiments and the accompanying drawings.

BRIEF DESCRIPTION OF THE DRAWINGS

For a complete understanding of the present invention, the objects and advantages thereof, reference is now made to the ensuing descriptions taken in connection with the accompanying drawings briefly described as follows.

Throughout the drawings, identical reference characters and descriptions indicate similar, but not necessarily identical, elements.

DETAILED DESCRIPTION OF PREFERRED EMBODIMENTS

Preferred embodiments of the present invention and their advantages may be understood by referring to FIGS. 1-17. The described features, structures, or characteristics of the invention may be combined in any suitable manner in one or more embodiments. It will be apparent to those skilled in the art that various modifications and variations can be made to the present invention without departing from the invention's spirit and scope. Thus, it is intended that the current invention cover modifications and variations consistent with the scope of the appended claims and their equivalents.

The present invention provides a solution for capturing audio and visual information presented on transparent, semi-transparent, or translucent display screens while permitting the presenter to face an audience or video camera. For simplicity, a display screen or writing surface with transparent, semi-transparent, or translucent properties is referred to herein as a transparent display screen or a transparent writing surface. In an embodiment of the invention, a presentation device comprises a transparent display screen with an integrated video camera optimized for the display screen. A presenter conveys information on one side of the display screen, as if writing on a whiteboard. The video camera captures (or audience observes) the information from the opposite side of the display screen. The display screen comprises a light source to inject light into an edge of the display screen to illuminate the display screen's information.

Figure 1:
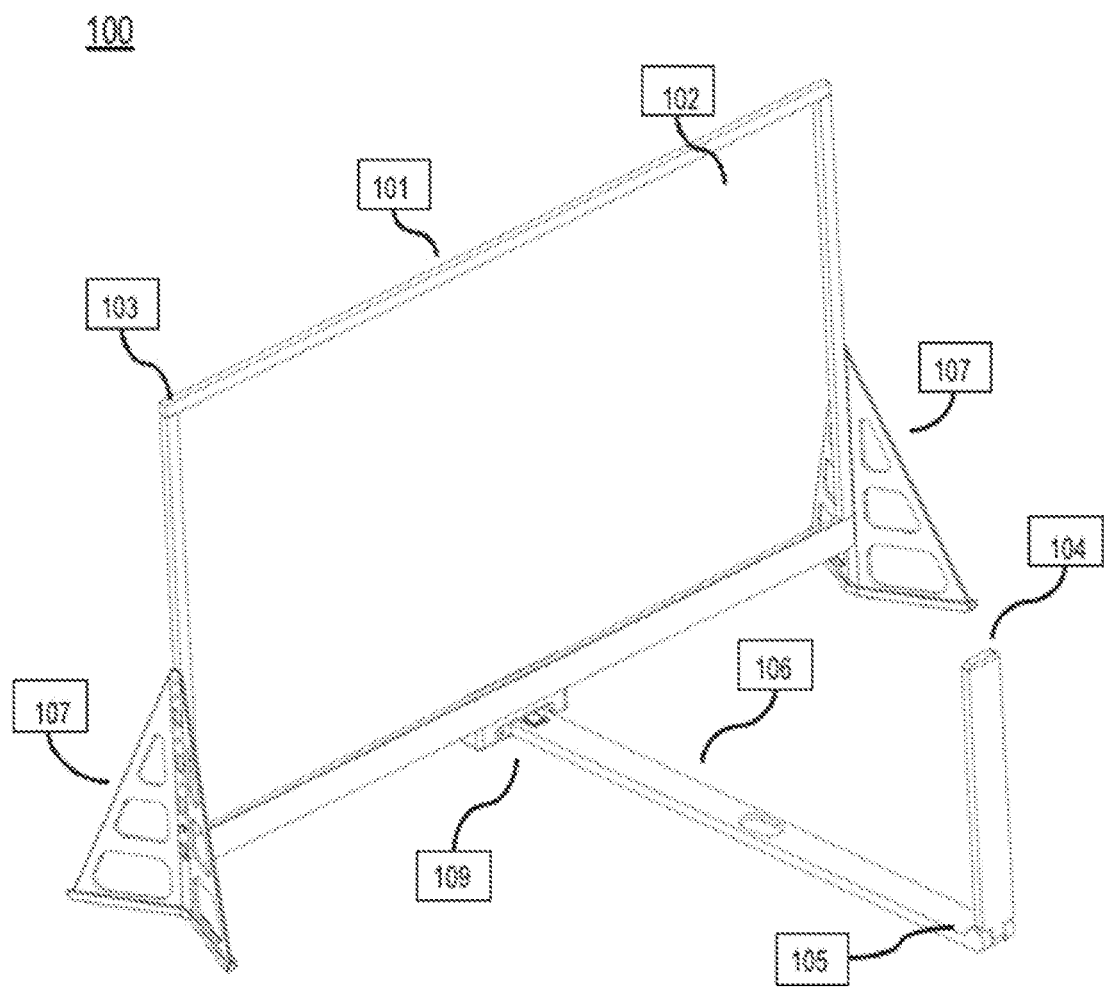
FIGS. 1 and 1A illustrate an exemplary device for capturing board writing, according to an embodiment of the invention.
Figure 1A:
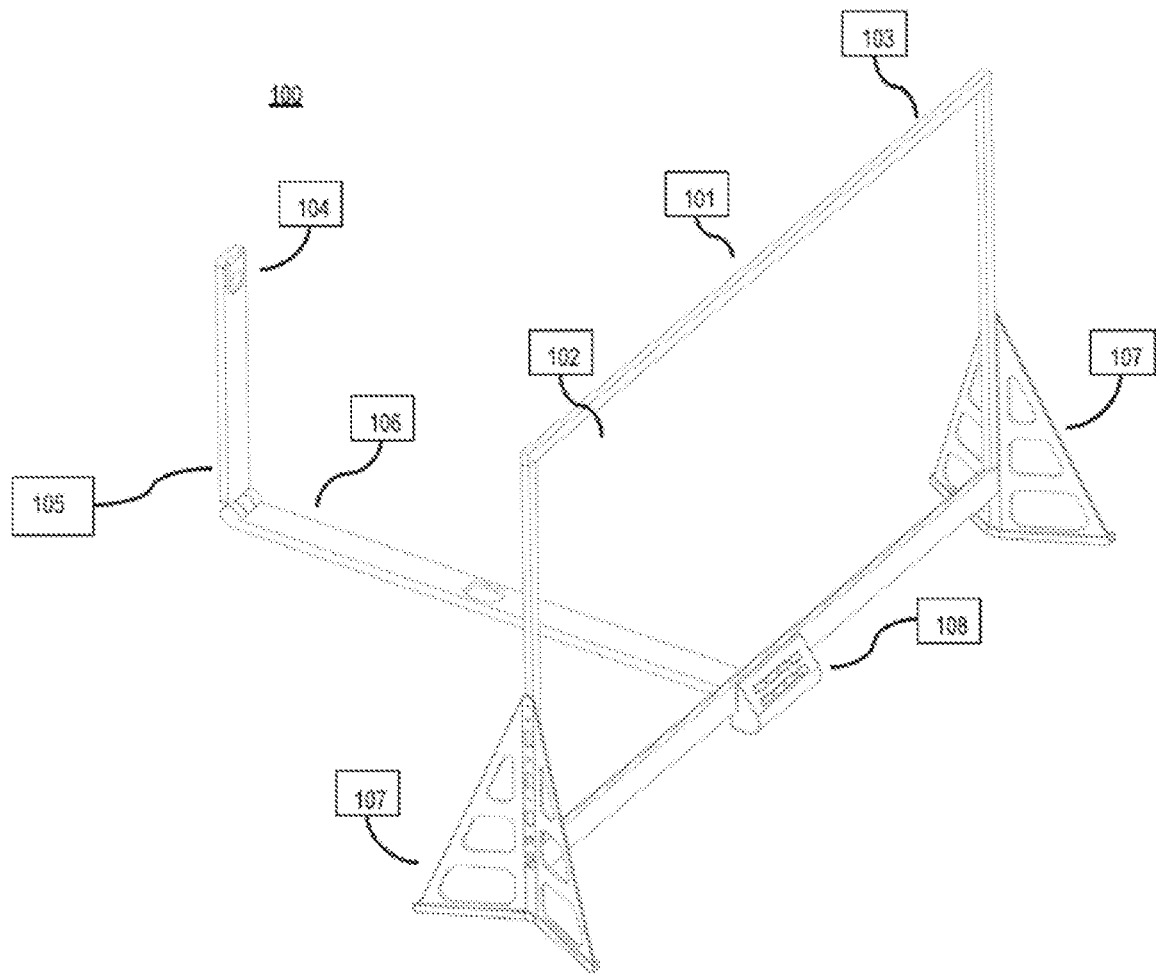

FIGS. 1 and 1A illustrate a presentation device 100 according to an embodiment of the invention. The presentation device 100 comprises a display screen 101 with a transparent writing surface 102 and a frame 103 surrounding some or all of the writing surface 102. In other embodiments, the frame 103 may traverse less than all of the writing surface's perimeter.

The display screen 101 can be any rigid, semi-rigid, or flexible material that is substantially, if not wholly, transparent. Substantially transparent refers to a degree of transparency sufficient to convey information presented (and optionally the presenter) on one side of the writing surface 102 to the opposite side of the writing surface 102. As noted above, the term transparent as used herein includes semi-transparent and translucent properties for ease of reference.

For example, the writing surface 102 may comprise glass. Preferably, the glass is tempered to provide strength and add safety if the glass display screen breaks or shatters. However, the writing surface 102 may comprise any suitable transparent, semi-transparent, or translucent material. For example, the writing surface 102 may include acrylic, plexiglass, polycarbonate, cellophane, latex, polyurethane, melamine, vinyl, polyester, or any combination thereof. In some embodiments, the writing surface 102 may be a single layer, or in other embodiments, the writing surface 102 may be multi-layered. In such a multi-layered embodiment, the writing surface 102 may have multiple layers of the same material, i.e., multiple layers of glass. Alternatively, the writing surface 102 may comprise multiple layers of different materials. For example, the writing surface 102 may include one or more glass layers and one or more layers of a polymer or polymeric material. Additionally, in such multi-layered embodiments, the various layers may be spaced apart or have an air gap between one or more layers.

Although the display screen 101 is shown as generally rectangular and flat, it may take any shape and orientation. For example, in some embodiments, the display screen 101 is rectangular. In other embodiments, the display screen 101 is circular or ovular in shape. In other embodiments, the display screen 101 can be curved to focus light directly on the audience or video camera 104.

The frame 103 comprises any suitable material, for example, any rigid or semi-rigid material including, but not limited to, wood, plastic, metal, or any combination thereof. The frame 103 comprises a light source such as light-emitting diodes ("LEDs") to inject light into the writing surface 102. In some embodiments, the light emitted from the light source may be in the visible spectrum or outside the visible spectrum. For example, the light emitted from the light source within the frame may be ultraviolet (e.g., blacklight), with a wavelength of approximately 350 nm to 400 nm. In another example, the light source emits white light or clear light where the digital color hues of red, green, and blue are enabled to show a colored light.

A built-in light source has the advantage of having its incidence angle (i.e., the angle at which the light interacts with the display screen) predetermined to maximize visibility to a viewer while minimizing its intrusion to the presenter. In such embodiments where particularized wavelengths of light are injected to correspond with specified colors, including red, green, and blue, the video camera 104 or computing device with accompanying software or firmware respectively, have filters pre-installed or preloaded that would filter out unwanted colors/effects from the captured multimedia information. As such, one or more filters correspond to the frequency of light injected. For example, the video camera 104 or computing device employs a filter to block unwanted red light when red light is injected. The video camera 104 may implement polarization filters as well. For example, in the case of a confidence monitor being present, the implementation of which is apparent to one of ordinary skill in the art, a polarization filter eliminates reflections on the writing surface 102 from the confident monitor.

The presentation device 100 comprises an integrated video camera 104. The video camera 104 can be, for example, a document camera, a single-lens reflex ("SLR") camera, a digital SLR ("DSLR") camera, a mirrorless camera, a digital camcorder, or a sports or action camera. The integrated video camera 104 may be detachably coupled as a modular camera to the presentation device 104 in another embodiment.

In another exemplary embodiment, the presentation device 100 comprises an electronic imaging device, such as, but not limited to, a document camera that captures a student's handwriting and/or pressing of buttons on a keyboard. The electronic device may further be configured to perform AI recognition and send vector data to a server. The server may analyze the vector data for handwriting recognition and/or grading and display relevant results on an electronic device in communication with the server via a network. In another embodiment, the system comprises a server configured to either analyze the vector data for handwriting recognition and/or grading or bypass such analysis to allow a teacher to perform grading.

Providing an integrated video camera 104 has several advantages over the prior art. For example, the field of view ("FOV"), i.e., the amount of visible area, can be tailored to specific applications. In such an example, the FOV can be such that only the writing surface 102 is observable, and the frame 103 (or other extraneous objects) is not. Tailoring the FOV can be accomplished in the video camera's 104 hardware by, for example, having an optical sensor with a predetermined size to match that of the writing surface 102, or in post-production, for example, by digitally cropping the captured multimedia information to excise unwanted portions. Another parameter that can be optimized is the exposure, i.e., the amount of light per unit area reaching the surface of an electronic image sensor, and is adjusted by shutter speed, lens aperture, or scene luminance. Another parameter that can be optimized is the depth of field, i.e., the distance between the closest and farthest objects in a photo or video stream that appears acceptably sharp. This parameter is important because if the video camera's 104 depth of field is too shallow, the writing surface 102 or the presenter, but not both, will be in focus, detracting from the acceptability of the visual experience provided by the present invention.

In an exemplary embodiment of the invention, the video camera 104 is detachably coupled to the distal end of an extension 106 attached to the frame 103 at a proximal end 109. Additionally, the extension 106 may have hinge 105 or another orientating mechanism that allows the video camera 104 to be folded to facilitate easy storage or transportation. The hinge 105 or another orientating mechanism can also correctly position or orientate the video camera 104. While in use, the video camera 104 is orientated in a direction towards the display screen 101. In this way, the video camera 104 captures the information on the writing surface 102 in the form of multimedia information, i.e., video. Because the information on the writing surface 102 is marked on the side opposite the video camera 104, the writing will be reversed when viewed from the audience's and video cameras' 104 perspectives. Accordingly, the multimedia information captured by the video camera 104 is processed to reverse (or "flip") the image/multimedia information about a vertical axis, thereby reorientating the image/video in a manner that appears "correct" to an audience member. Although multimedia information may be discussed herein in the context of a video stream (with or without audio), multimedia information also includes photos, still images, video stills/frames, video images, and video streams, either compressed or uncompressed, without departing from the contemplated embodiments.

The presentation device 100 may optionally utilize one or more displays for displaying the video captured by the video camera 104. Such a display can be any type of display, the identification and implementation of which are apparent to one of ordinary skill in the art. Exemplary displays include electroluminescent ("ELD") displays, liquid crystal display ("LCD"), light-emitting diode ("LED") backlit LCD, thin-film transistor ("TFT") LCD, light-emitting diode ("LED") displays, OLED displays, transparent OLED displays ("TOLED"), AMOLED displays, plasma ("PDP") display, and quantum dot ("QLED") displays. Additionally, the displays can be standalone units such as televisions or computer monitors or integrated into other devices such as cellular telephones and tablet computers. The one or more displays may further comprise touch-sensitive displays capable of interacting with a user's finger or an electronic/digital pen.

In an embodiment of the invention, the video camera 104 or other hardware and software components described herein can be used to facilitate built-in video conferencing. In such an embodiment, a user can initiate a video teleconference wherein the video camera 104 captures multimedia information communicated to other video teleconference members.

As shown in FIGS. 1 and 1A, the extension 106 may be detachably coupled to the frame 103 at connector 109. The video camera 104 is mounted at the distal end of the extension 106. In some embodiments, the extension 106 may comprise a hinge or other orientating mechanism 105 to facilitate the video camera's 104 orientation toward the writing surface 102.

The presentation device 100 is preferably configured to be free-standing, e.g., set on a table or other horizontal surface. In such an embodiment, the presentation device 100 comprises stands 107 that allow the display screen 101 to sit in an upright orientation. The stands 107 may include mounts that attach the stands 107 to the frame 103 and may be adjustable so that the display screen's 101 height may be raised or lowered relative to the horizontal surface on which it stands.

The presentation device 100 further comprises a control panel 108 used to control various aspects of the presentation device 100. For example, the control panel 108 may be configured to control the video camera 104 (or various attributes thereof, e.g., exposure, contrast, saturation, DOF, FOV, etc.). The control panel may also control light sources integrated into various parts of the presentation device 100, e.g., the frame 103. In some embodiments, the control panel 108 is embodied by a separate tablet, cellphone, or another smart device. In such an embodiment, the control panel 108 may be embodied as an interactive display, which may be configured to view or control the multimedia information captured by the video camera 104, participate in video conferencing, and the like. For example, a presenter can use a touch screen implementation of the control panel 108 that is digitally shown on the display screen 101.

Figure 2:
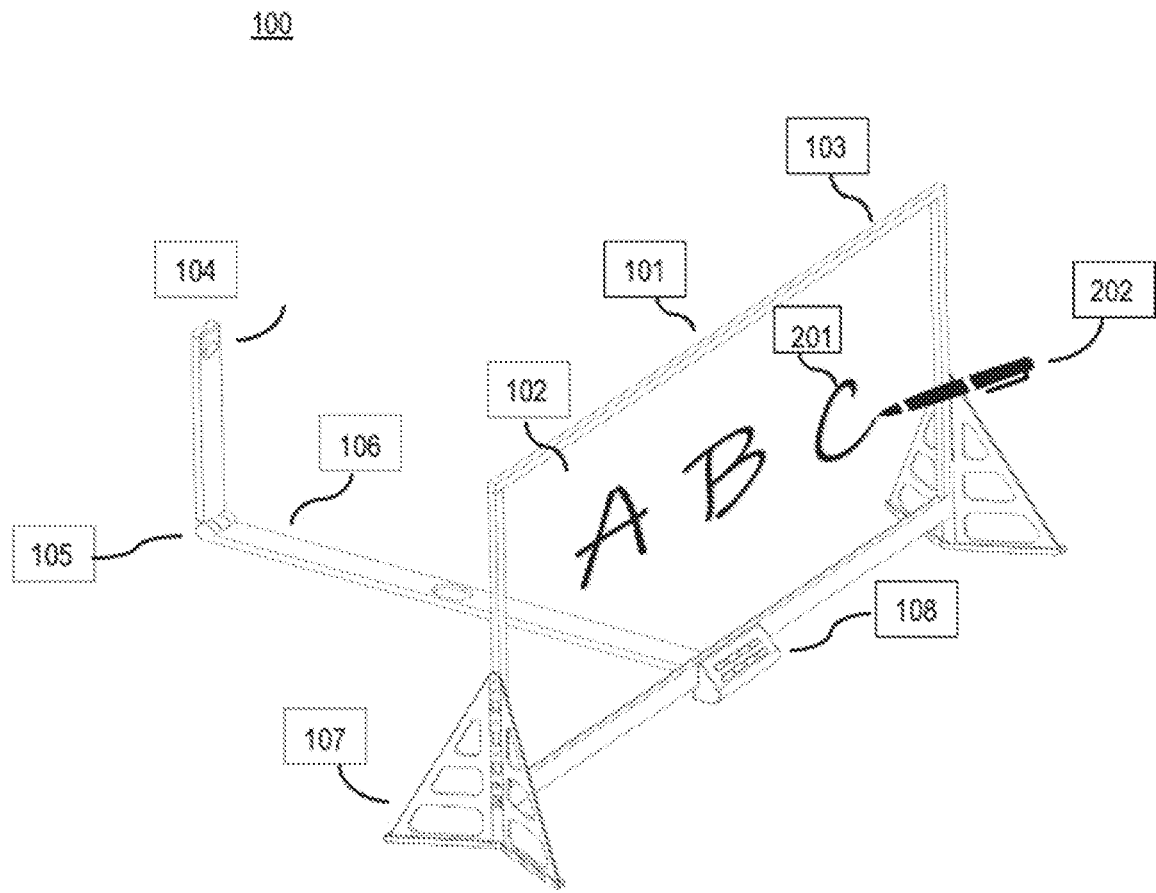
FIG. 2 illustrates an exemplary device for capturing board writing with markings shown, according to an embodiment of the invention.

With reference to FIG. 2, a presenter or other user utilizes a physical pen or marker (writing instrument) or a digital form via a touch implementation or other writing technique 202 to mark a writing 201 on the display screen 101. For example, the user (not shown) draws "A B C" 201 on the display screen 101. The video camera 104 captures video that includes the writing 201. Notably, the writing 201 is marked on the writing surface 102 on the side opposite to that of the video camera 104, and thus, when viewed from the video camera's 104 perspective, the writing 201 appears backward.

Figure 3:
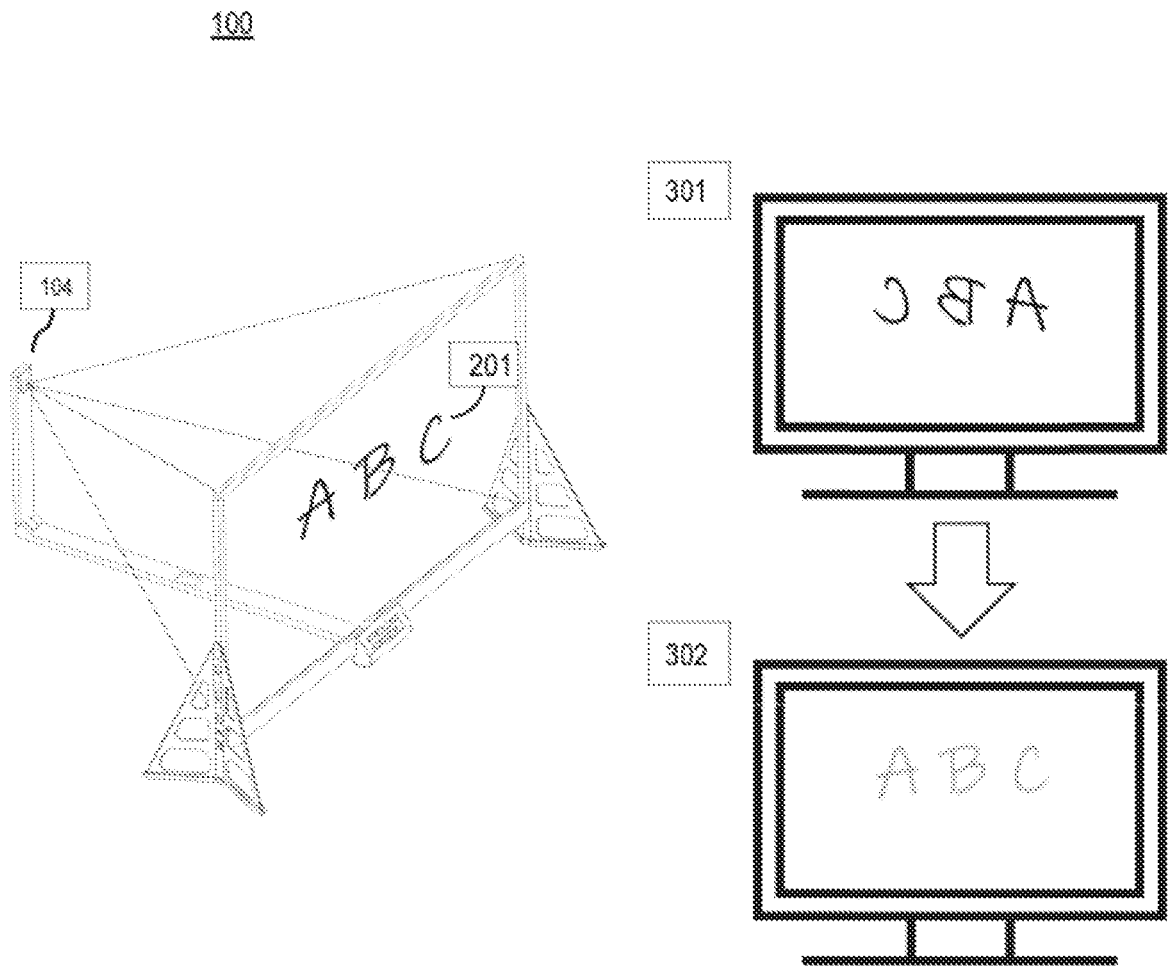
FIGS. 3 illustrates an exemplary device for capturing board writing with displays, according to an embodiment of the invention.

Continuing with the previous exemplary embodiment and with reference to FIG. 3, the video camera 104 captures the writing 201 from a perspective opposite to that of the writer/presenter (not shown). If the video captured by the video camera 104 were viewed without processing, the images would appear reversed. For example, if displayed without reorientation, the writing 201 would appear as shown on display 301. However, the presentation device 100 (or a separate computer or display coupled to it) processes the multimedia information captured by the video camera 104 to reorientate, i.e., flip, it about a vertical axis. Once processed, the writing 201 appears correctly orientated and in the writer's direction, as shown on display 302. In this way, the device 100 captures multimedia information (e.g., audio and video) from a perspective opposite the writer/presenter. Still, it produces the video rearranged in the correct orientation in real-time or near-real-time, i.e., with an imperceptible delay to an ordinary human observer. In addition to reorientating the multimedia information, the device 100 can also process the multimedia information to effectuate other desired outcomes, such as adjusting the exposure, brightness, focus, saturation, sounds, DOF, FOV, or other audio-visual effects. The device 100 can also process the multimedia information by compressing the video or sound stream to decrease latency, decrease the storage space required, or facilitate transmissibility, the implementation of which is readily apparent to one of ordinary skill in the art.

Figure 4:
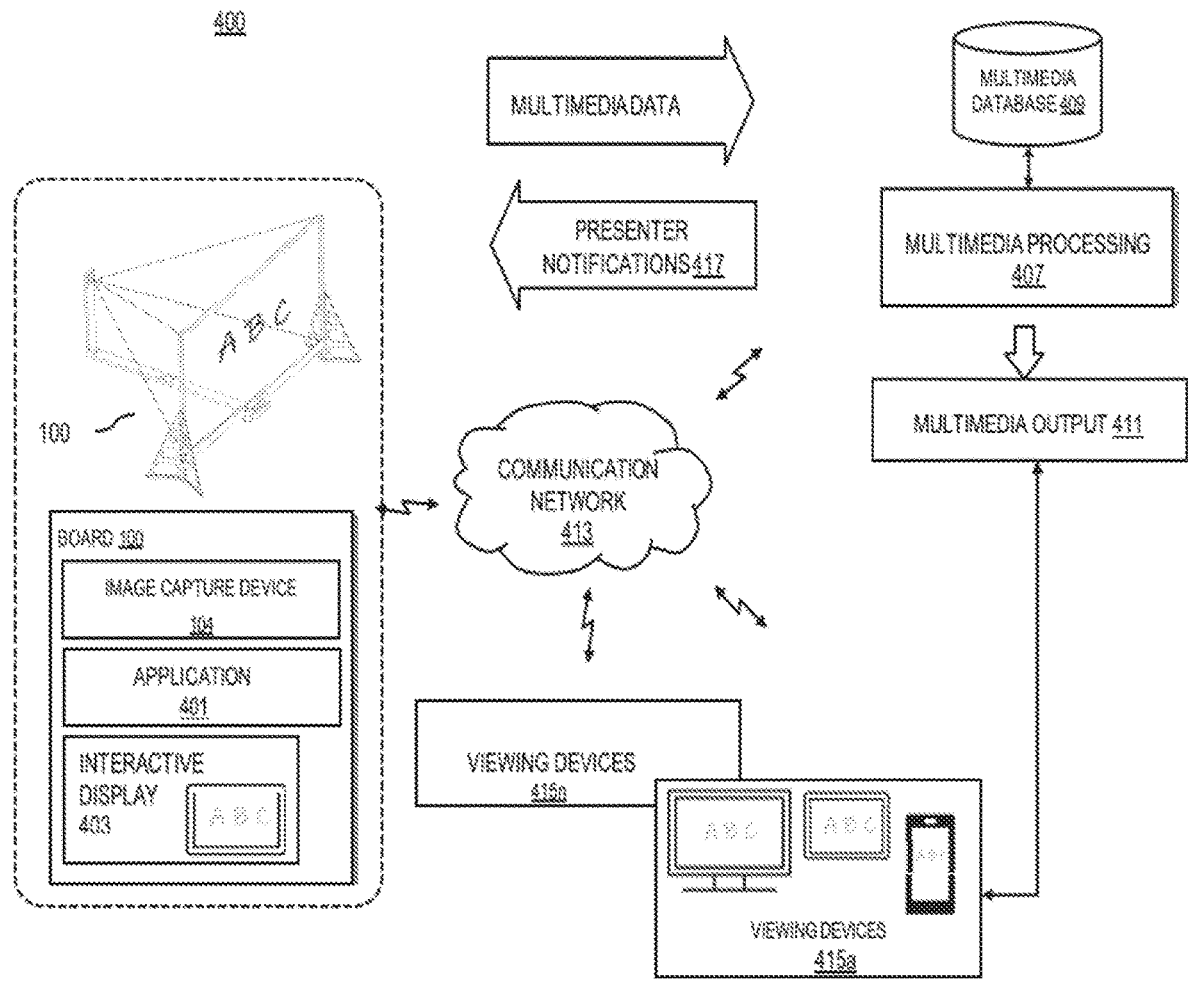
FIG. 4 illustrates an exemplary system for capturing board writing, according to an embodiment of the invention.

In another exemplary embodiment and with reference to FIG. 4, a system 400 captures writings 201 and transmits the information to viewing devices 415(a)-(n). The presentation device 100 comprises an integrated video camera 104 and a computer program or alternatively called herein an application 401 loaded thereon and configured to control various aspects of the system or effectuate processes described herein. The presentation device 100 may further comprise a controller/interactive display 403. Once the video camera 104 captures multimedia information, including the writing 201, e.g., a video, the multimedia information is transmitted for multimedia processing at step 407. The multimedia information can be transmitted across the communication network 413. As part of the processing, the system 400 reorientates a visual component about a vertical axis, as noted above. The system 400 stores the multimedia information in multimedia database 409, either before or after processing. Once processed, the multimedia information is outputted, at step 411, to various devices. For example, the processed multimedia information can be sent to viewing devices 415a-n. Such viewing devices 415a-n may include televisions, monitors, computers, desktop computers, laptop computers, kiosks, smartphones, portable electronic devices, tablets, or any other device comprising a display screen. One or more of the viewing devices 415a may communicate with other viewing devices 415n through the communication network 413 or directly, for example, via Bluetooth. In an embodiment utilizing built-in video conferencing, the viewing devices 415a-n may be participants in the teleconference along with the user/presenter using the presentation device 100. The communication network 413 may be the Internet or any computer network, the identification and implementation of which are apparent to one of ordinary skill in the art.

One or more of the viewing devices 415a can send information back to the system 400. In such an example, a user of the viewing device 415a can send, for example, a presenter notifications 417 to the display screen 101 or other components thereof. The notifications 417 can be displayed, for instance, on the interactive display 403. In the context of a classroom setting, a student using viewing device 415a can, for example, send a question 417 to the instructor using display screen 101. The question 417 may then be displayed on display 403. The instructor may use interactive display 403 or application 401 to answer or cancel the question 417. The question 417 can also be displayed on one or more of the viewing devices 415n. Other students using the viewing devices 415n may also be able to answer/cancel the question 417 with or without input from the instructor using display screen 101.

Figure 5:
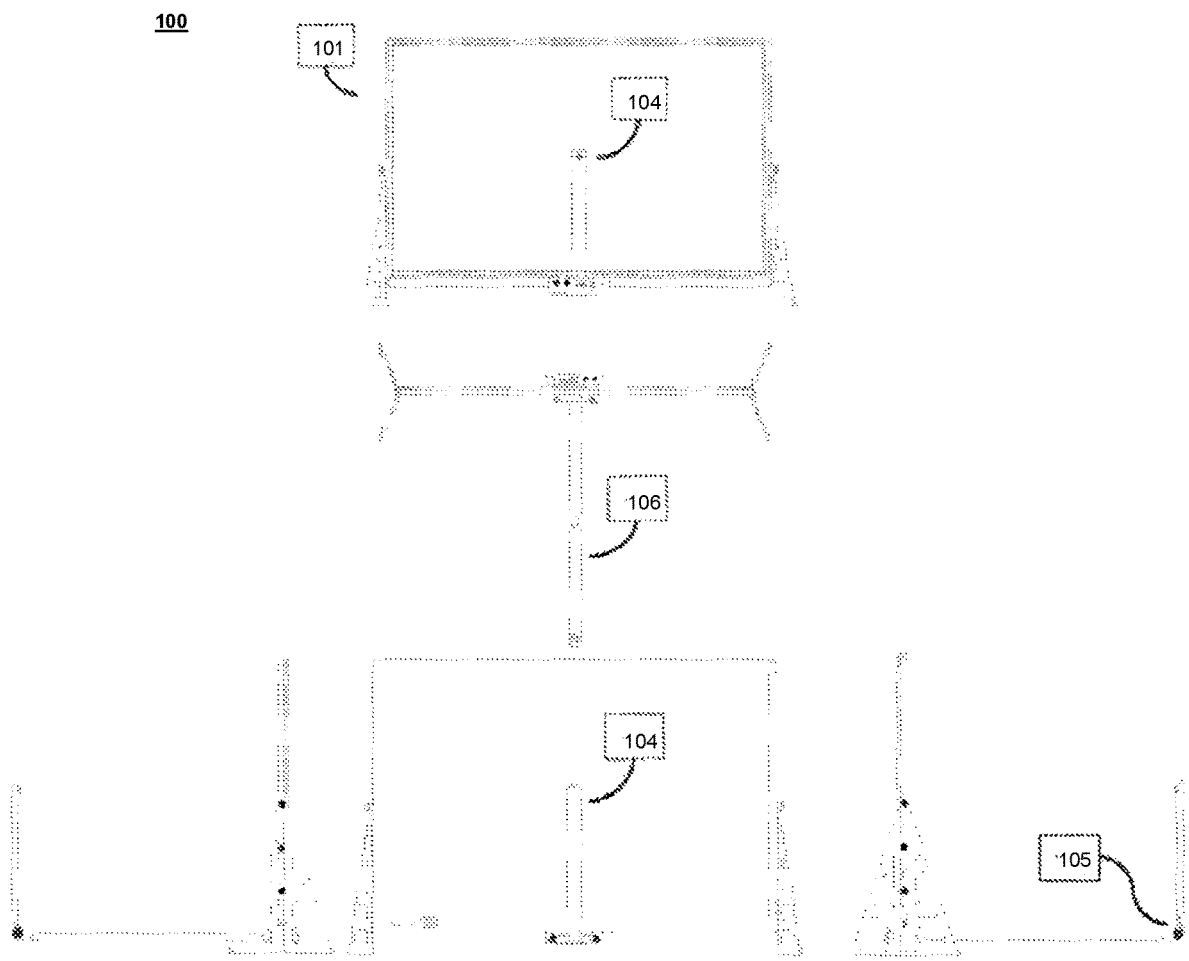
FIG. 5 illustrates exemplary perspective views of a device for capturing board writing with the video camera in an upright orientation, according to an embodiment of the invention.
Figure 6:
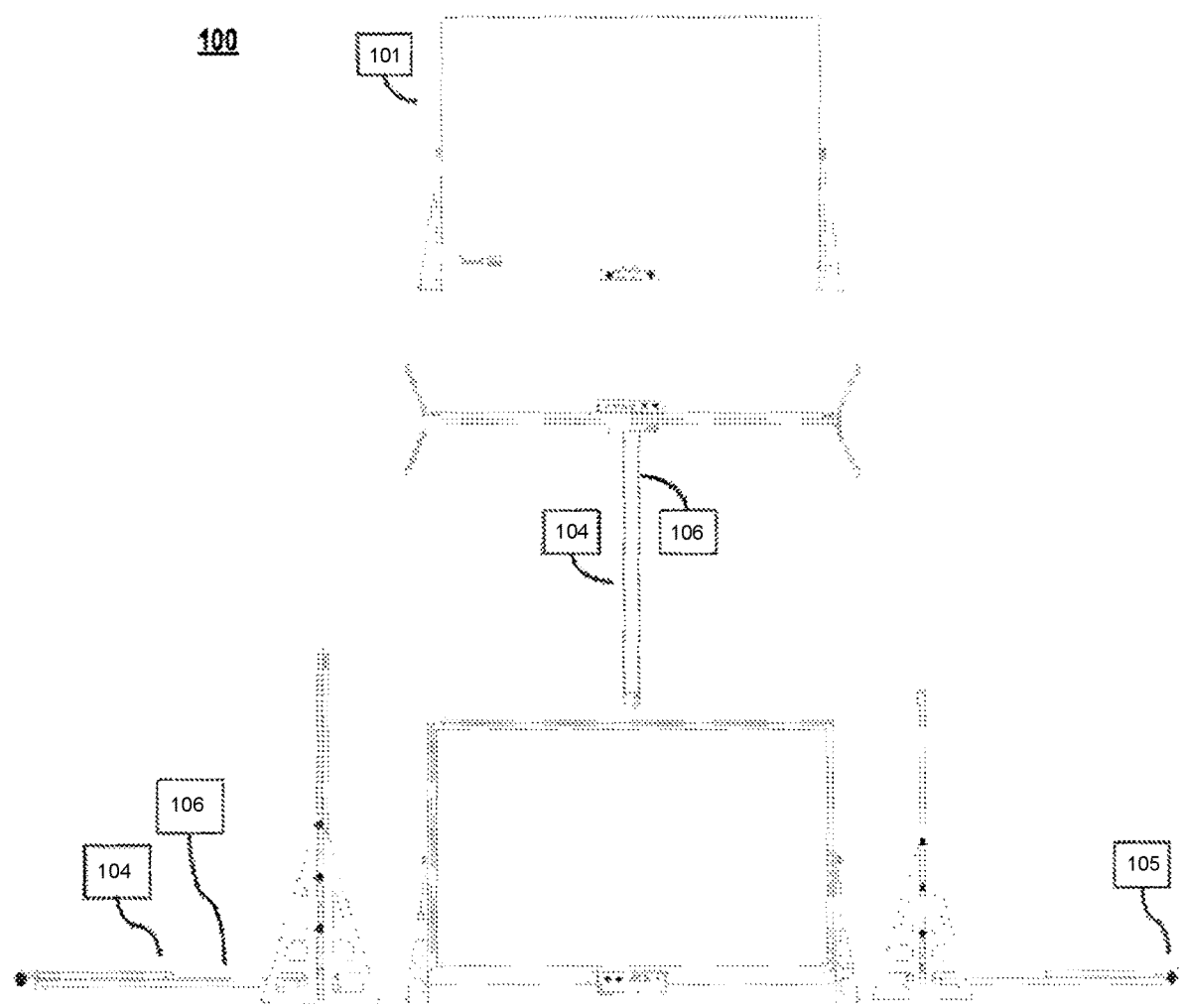
FIG. 6 illustrates exemplary perspective views of a device for capturing board writing with the video camera in a stowed orientation, according to an embodiment of the invention.

FIGS. 5 and 6 illustrate various perspective views of certain embodiments of the present invention as presentation device 100. FIG. 5 illustrates the video camera 104 extended in an upright orientation. Contrastingly, FIG. 6 illustrates the video camera 104 collapsed using hinge 105. The display screen 101, video camera 104, and extension 106 can be easily collapsed to facilitate easy transport.

Figure 7:
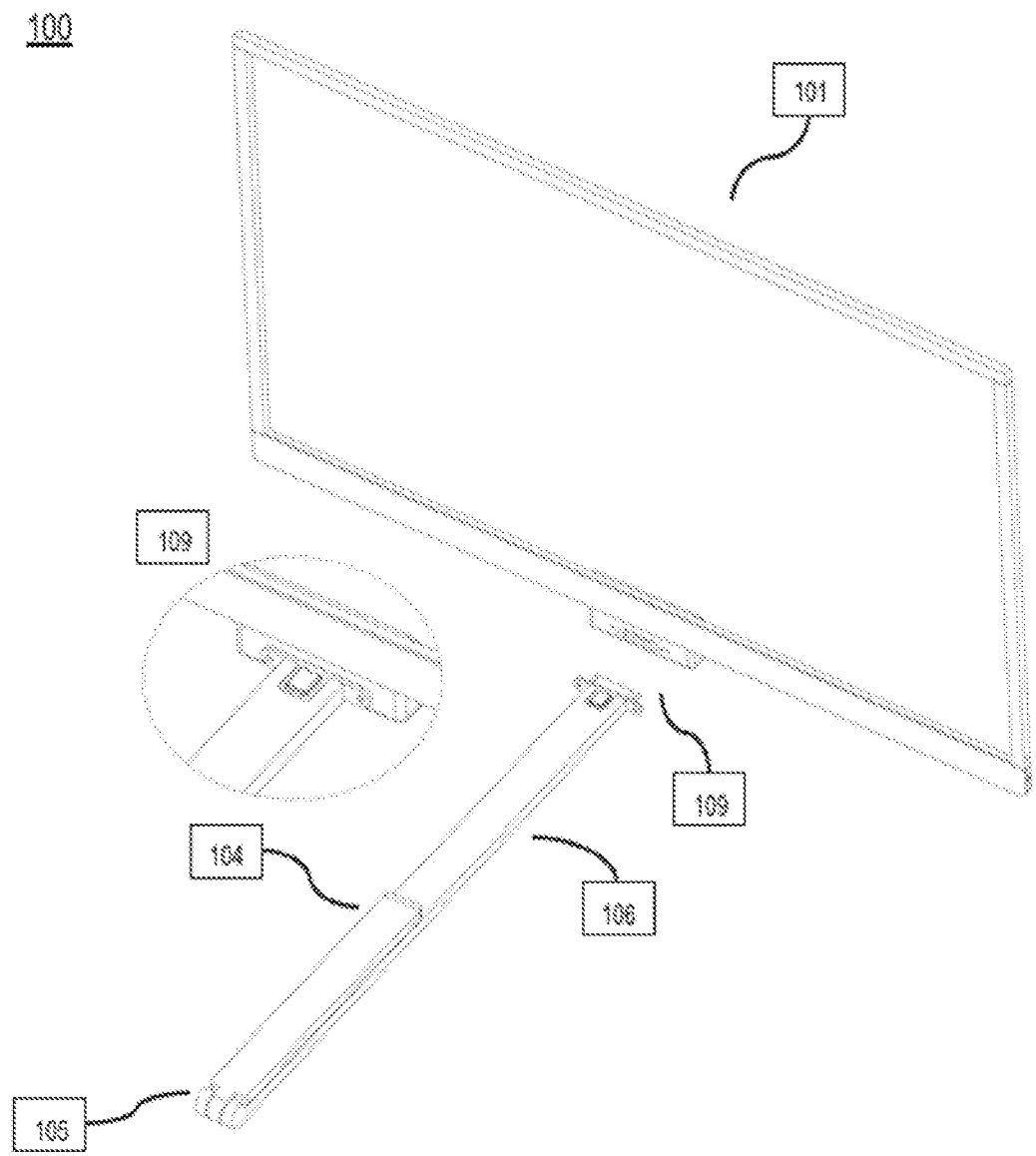
FIG. 7 illustrates an exemplary device for capturing board writing with a removably coupled extension, according to an embodiment of the invention.

In another exemplary embodiment and with reference to FIG. 7, the video camera 105 can be collapsed at hinge 105 (e.g., folded) to facilitate easy storage or transportation. The extension 106 may also be removably attached to the frame 103 at connection 109 using screws or a one-button quick disconnect. In another embodiment, connector 109 may also comprise a hinge or other orientating mechanism (not shown) to allow the extension 106 to collapse without being detached from display screen 101. FIG. 7 also illustrates an embodiment of the present invention that is not free-standing.

Figure 8A:
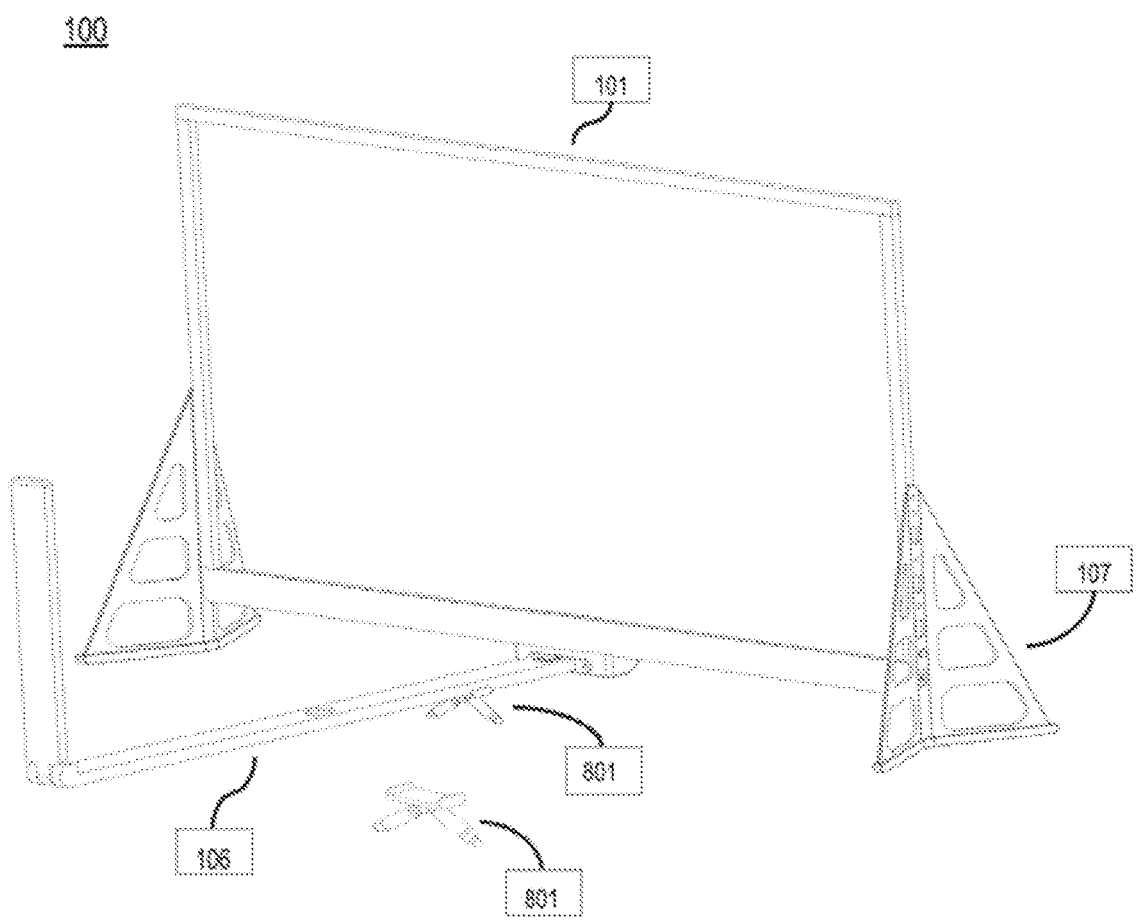
FIGS. 8A and 8B illustrate an exemplary device for capturing board writing with supports, according to an embodiment of the invention.
Figure 8B:
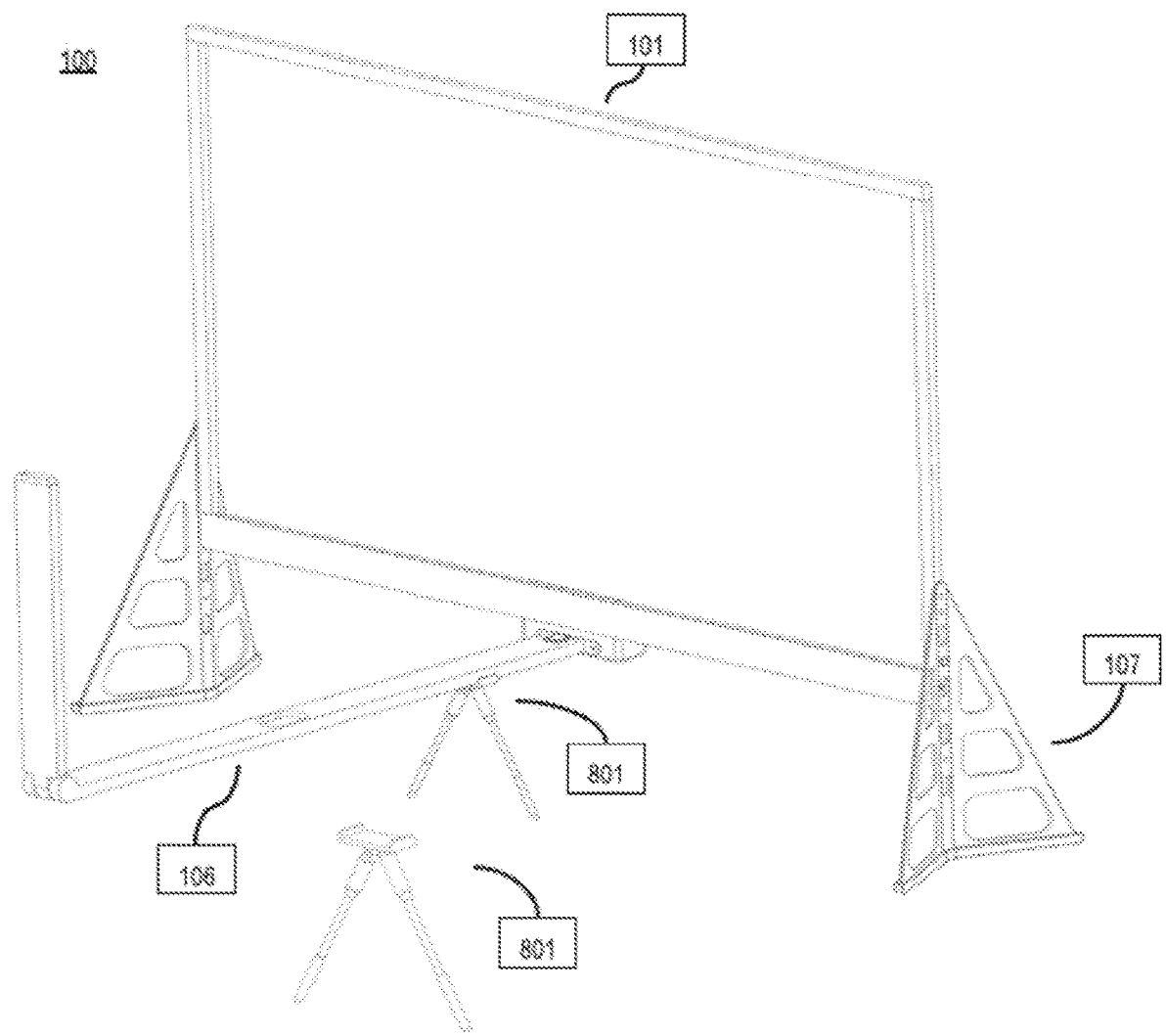

In another exemplary embodiment and with reference to FIGS. 8A and 8B, the presentation device 100 may further comprise a support 801 to support the extension 106 to alleviate stress at connector 109. Support 801 may be configured so that it can be mounted to the extension 106 at any point. Additionally, the support 801 may have telescopic legs allowing the support 801 to vary in height. For example, in FIG. 8A, the display screen 101 is mounted to the stands 107 in a relatively low position. In this embodiment, the legs of the support 801 are also retracted to match the height of the display screen 101. In contrast, as shown in FIG. 8B, the display screen 101 is mounted to the stands 107 in a relatively high position. In this embodiment, the support's 801 legs are also extended to match the height of the display screen 101. In this way, the support 801 enables the user to ensure the video camera 104 is correctly orientated relative to the display screen 101.

Figure 9A:
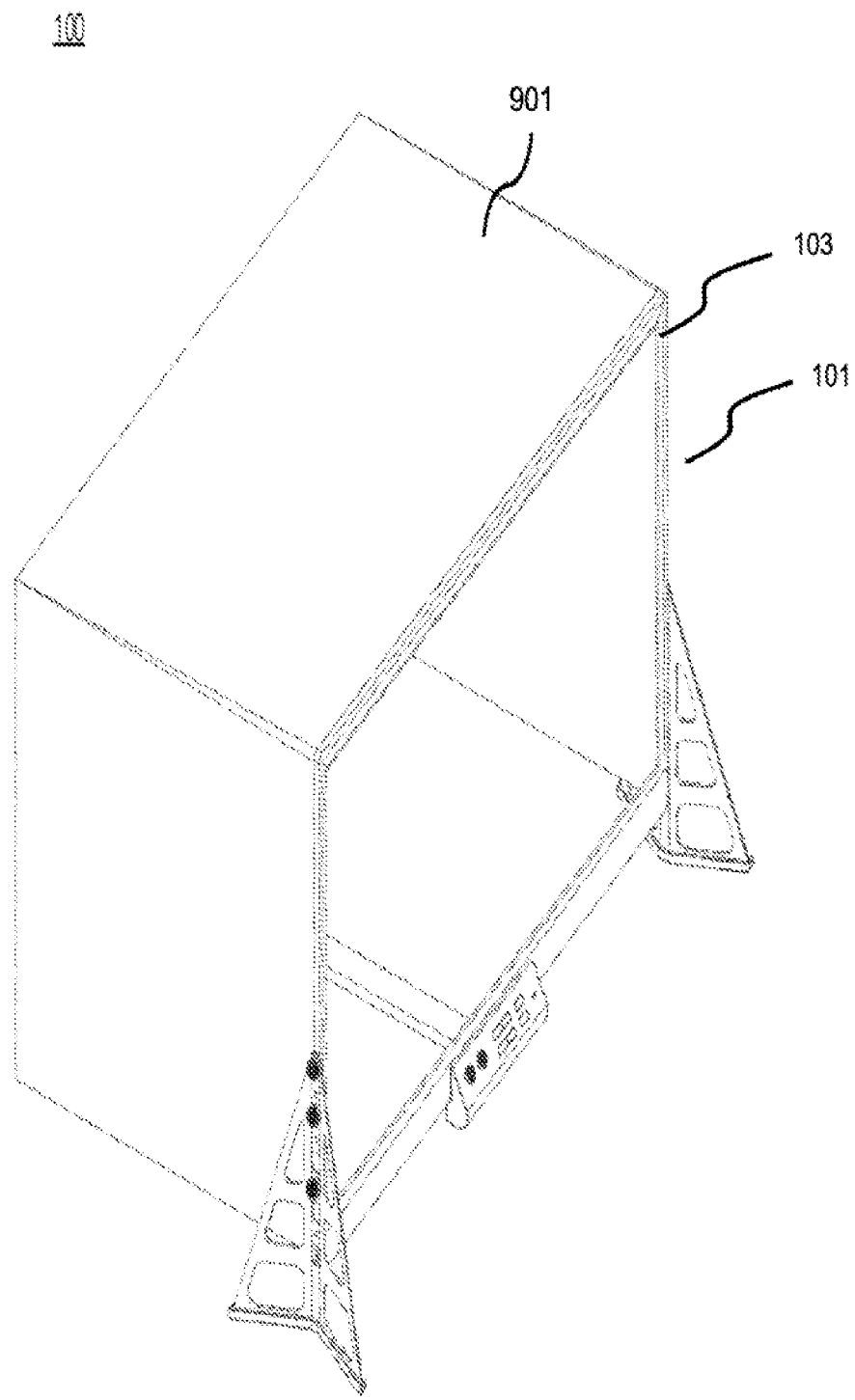
FIGS. 9A, 9B, and 9C illustrate an exemplary device for capturing board writing with an interactive display, according to an embodiment of the invention.
Figure 9B:
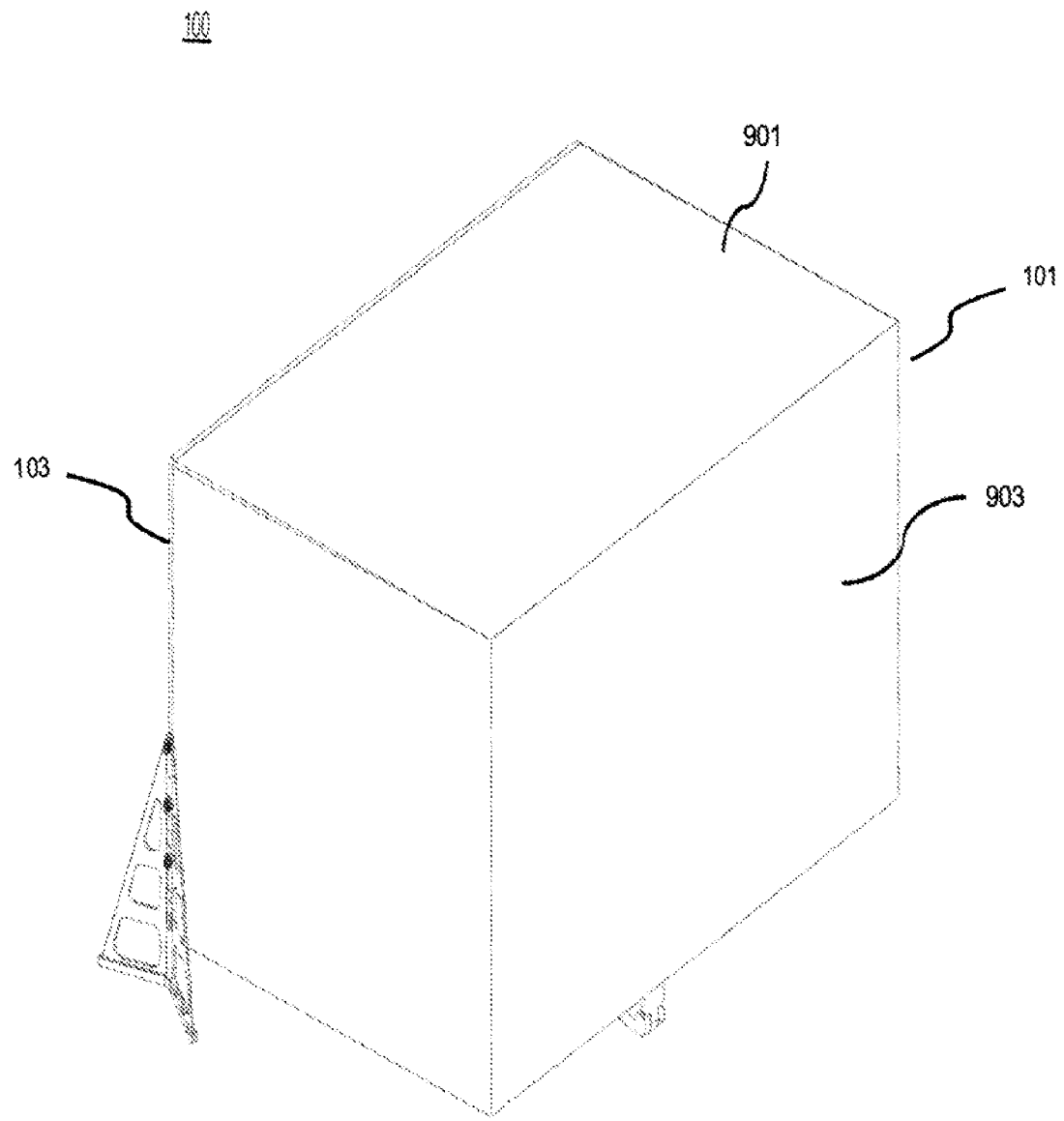
Figure 9C:
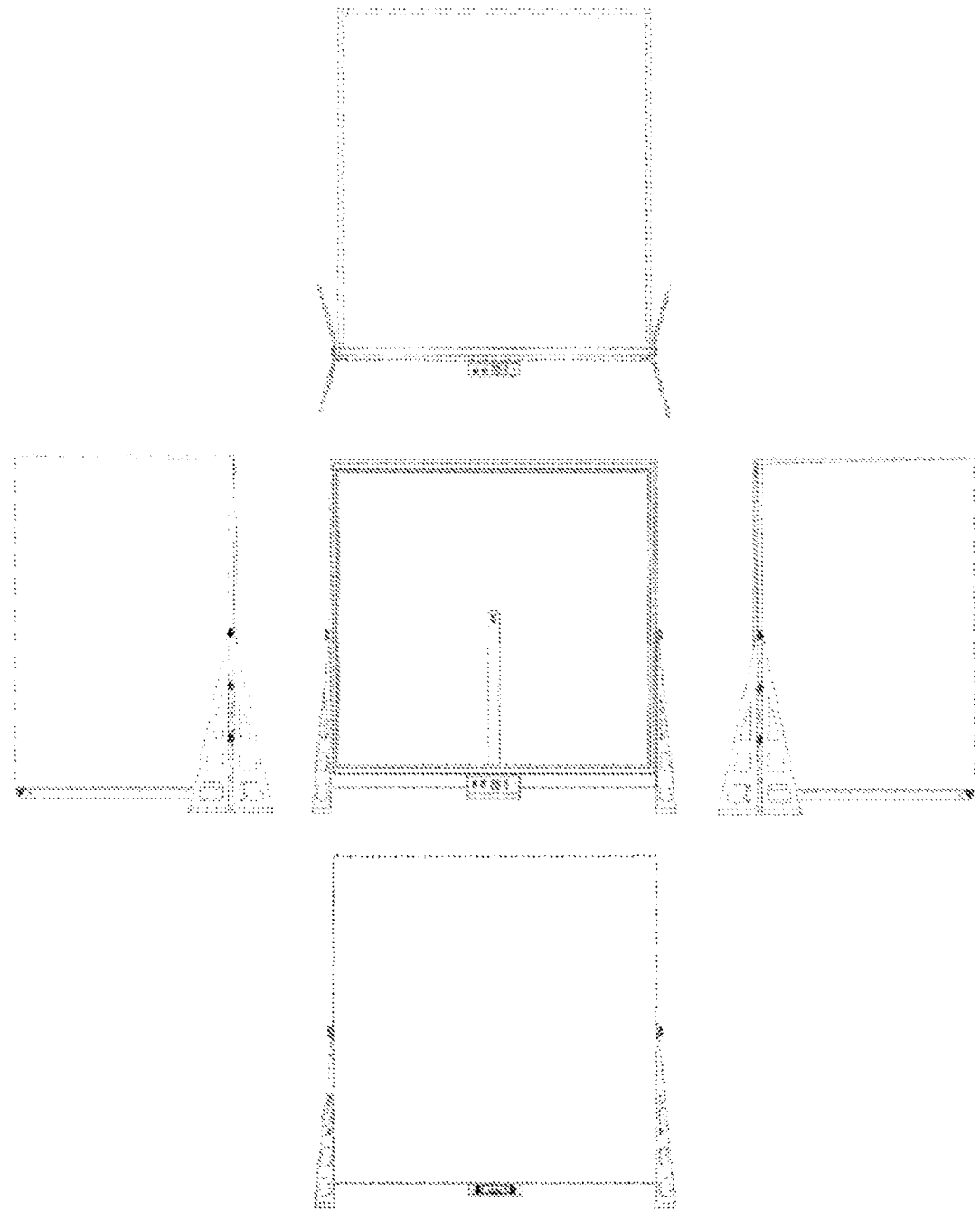

In another exemplary embodiment and with reference to FIGS. 9A, 9B, and 9C, presentation device 100 comprises hood 901. In some embodiments, hood 901 may be made from fabric or other pliable material. Exemplary fabrics include and are not limited to canvas, chenille, chiffon, cotton, crepe, gingham, jersey, leather, linen, polyester, spandex, velvet, and viscose, or a combination thereof. In other embodiments, hood 901 may be made from a rigid or semi-rigid material such as a polymer or plastic. Hood 901 allows the user to control the amount of extraneous light interacting with display screen 101 of presentation device 100. For example, ambient light can degrade the viewing experience by overpowering the injected light, thereby reducing the perceived luminosity of writings 201. Hood 901 attaches to the presentation device 100 and extends from frame 103 in a direction toward image capture device 104. Hood 901 may extend to envelop the entire image capture device 104 or to some length short of image capture device 104. In an exemplary embodiment, a plurality of rods or other support structure may extend from frame 103 in the direction of the image capture device 104. Hood 901 may be extended or retracted anywhere along the length of the rods or support structure to adjust the amount of ambient light that interacts with screen 102. One or more portions of hood 901 may be configured to be transparent or semi-transparent and may comprise, for example, a polarizer, thereby reducing and/or controlling the reflection on display 101.

In another embodiment of the present invention, the presentation device 100 comprises an image capture device 104 positioned by an extension 106. The image capture device 104 may be further configured to move and/or rotate about one or more axes. Image capture device 104 is rotatable about two axes, i.e., up-and-down, left-and-right. Additionally, image capture device 104 may be configured so that its position relative to display screen 101 is adjustable. For example, image capture device 104 may be configured to move vertically and horizontally instead of or in addition to being rotatable. Although not shown, image capture device 104 may be configured to move closer to or farther from the display screen, i.e., movable about the z-axis. By achieving more degrees of freedom, image capture device 104 can more accurately adjust its position and viewing angle, which helps ensure the user is always looking at image capture device 104. In this way, movable image capture device 104 enhances the presentation experience. Although image capture device 104 may be shown and described as orientable about four axes, any number of axes, including six, may be utilized without departing from the contemplated embodiments. The presentation device 100 or another external computing device coupled thereto may control the direction or orientation of image capture device 104. Additionally, presentation device 100 may comprise one or more sensors and other hardware and software that enable presentation device 100 to track the eye position and/or the head position of the user, the implementation of which will be readily understood by one skilled in the art. In such an embodiment, presentation device 100 periodically reorients image capture device 104 to be pointed at the user's eyes and/or head. In this way, image capture device 104 will be continuously oriented at the user's eyes or head, further enhancing the viewing experience. This helps maintain the human "eye-to-eye" contact that is lost using conventional videoconferencing techniques. To implement such a presentation device 100, image capture device 104 and display 101 may be optimized to work in conjunction with each other.

Figure 10A:
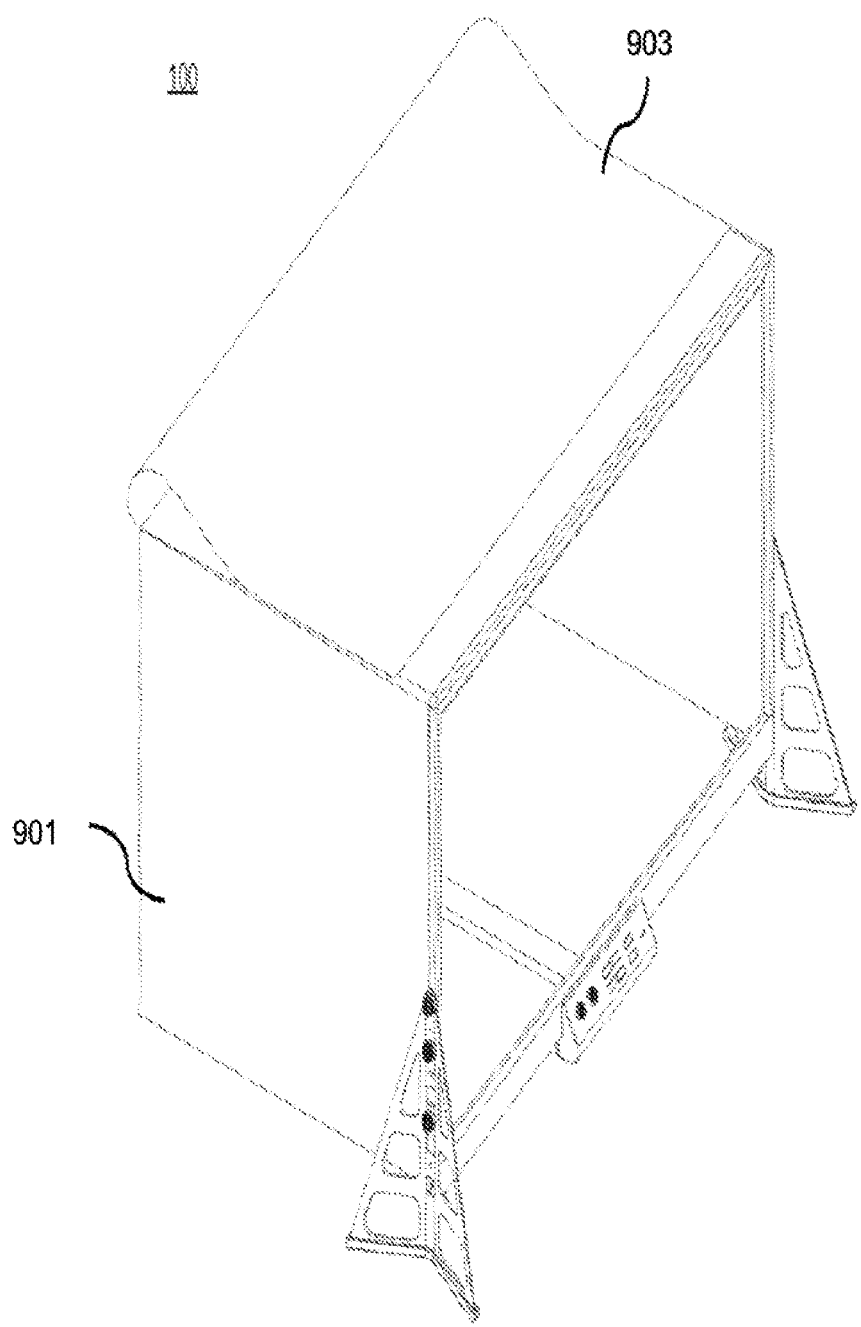
FIGS. 10A, 10B, and 10C illustrate an exemplary device for capturing board writing with a video camera located in a lower position, according to an embodiment of the invention.
Figure 10B:
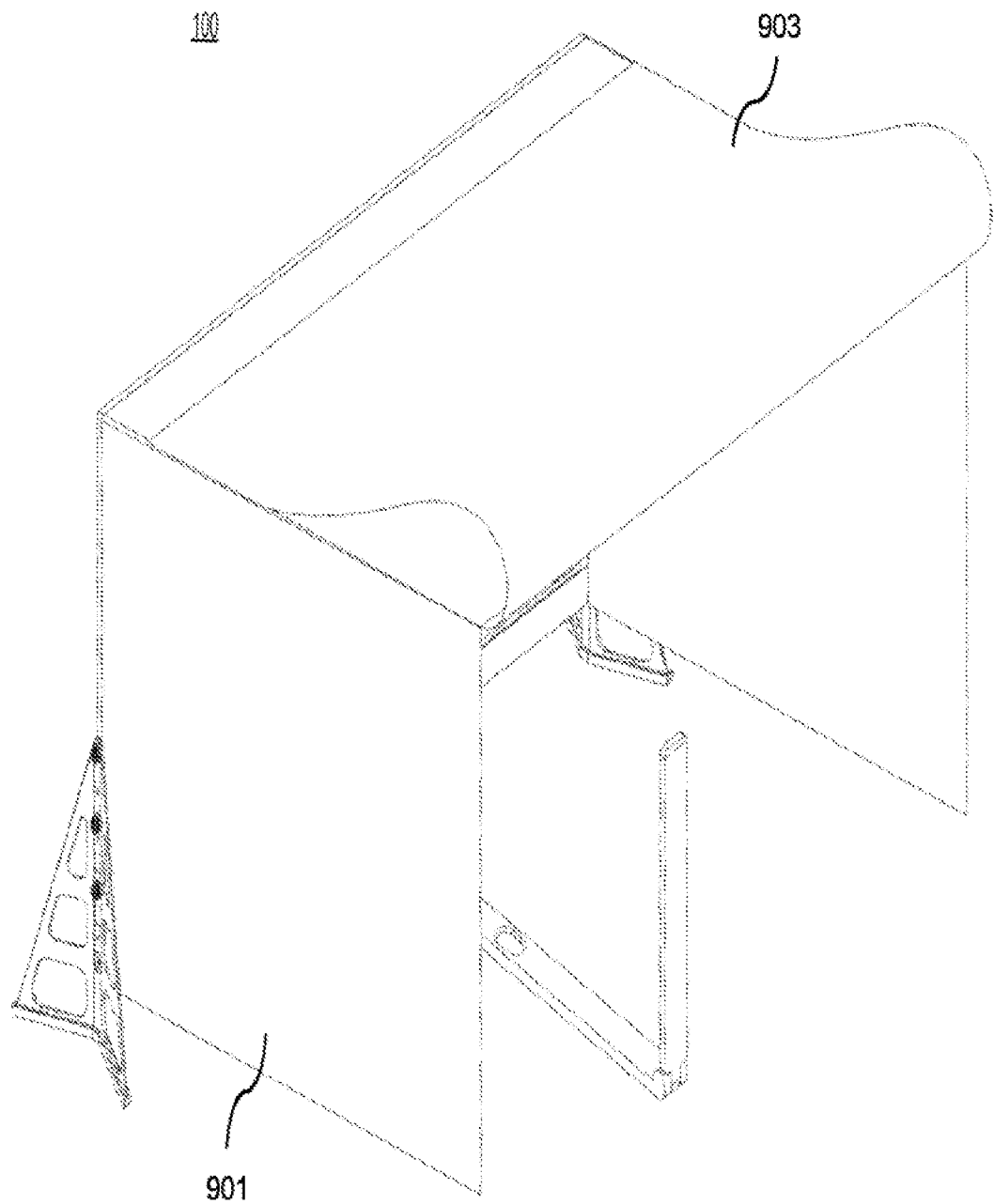
Figure 10C:
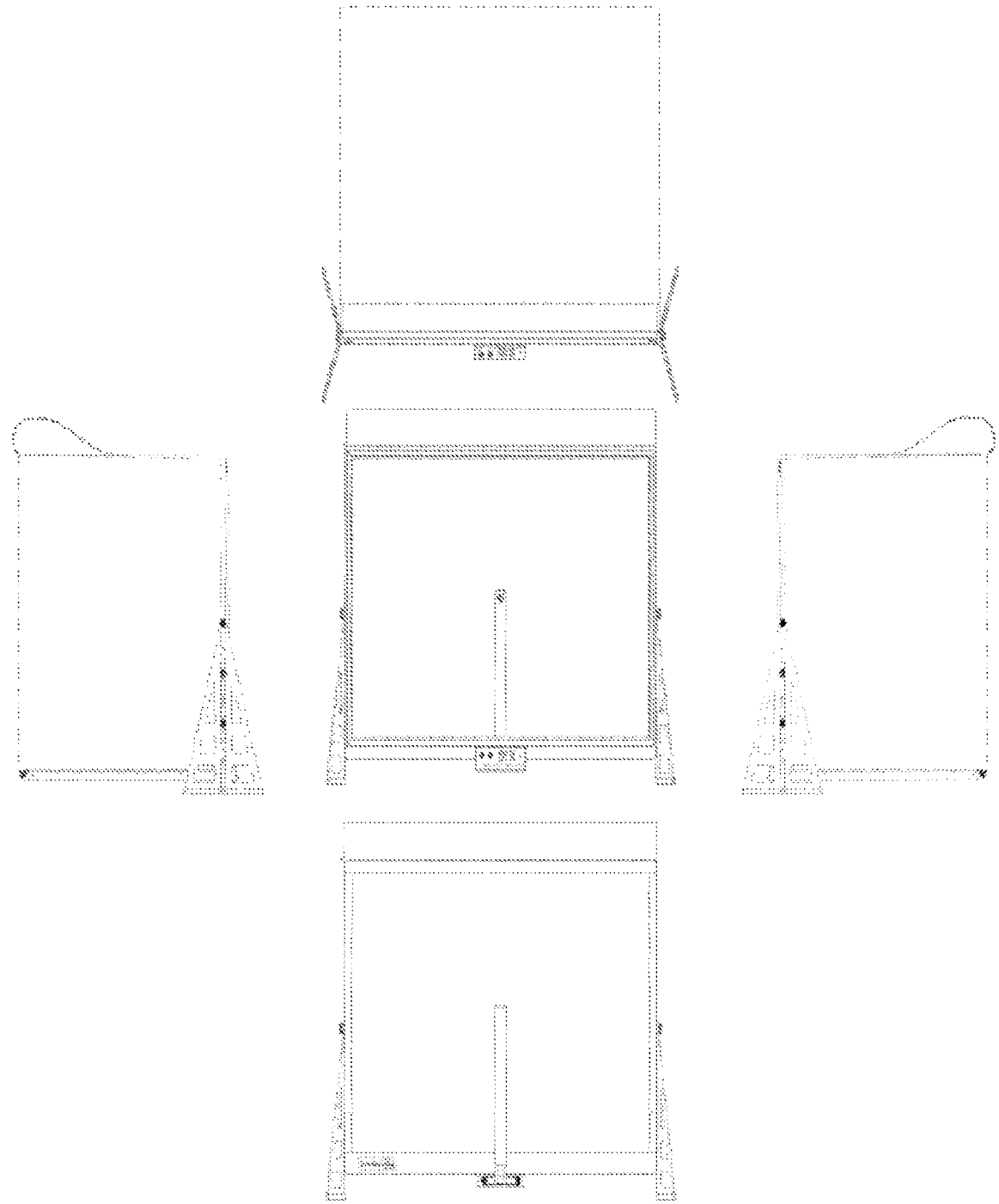

In another embodiment, and with reference to FIGS. 10A, 10B, and 10C, hood 901 may comprise an apron 903. Apron 903 may attach to hood 901 along one side, e.g., the top portion. Apron 903 may be transitionable from a first position (i.e., a closed position) to a second position (i.e., an open position). For example, apron 903 can be user-configurable to an open or a closed state and anywhere in between, depending on lighting conditions. This allows the user to fully enclose one side of the presentation device 100. As such, apron 903 may be opened, thereby allowing the audience the see the user while still maintaining control of the ambient light interacting with the writing surface. Apron 903 may be releasably attached to the hood 901 along one or more sides of the hood 901. Apron 903 may attach to hood 901 using any methodologies known in the art, for example, hook-and-loop fasteners, Velcro, snaps, caps, buttons, or zippers. Hood 901 may optionally be also used for a carrying case for one or more components of the presentation device 100.

Figure 11:
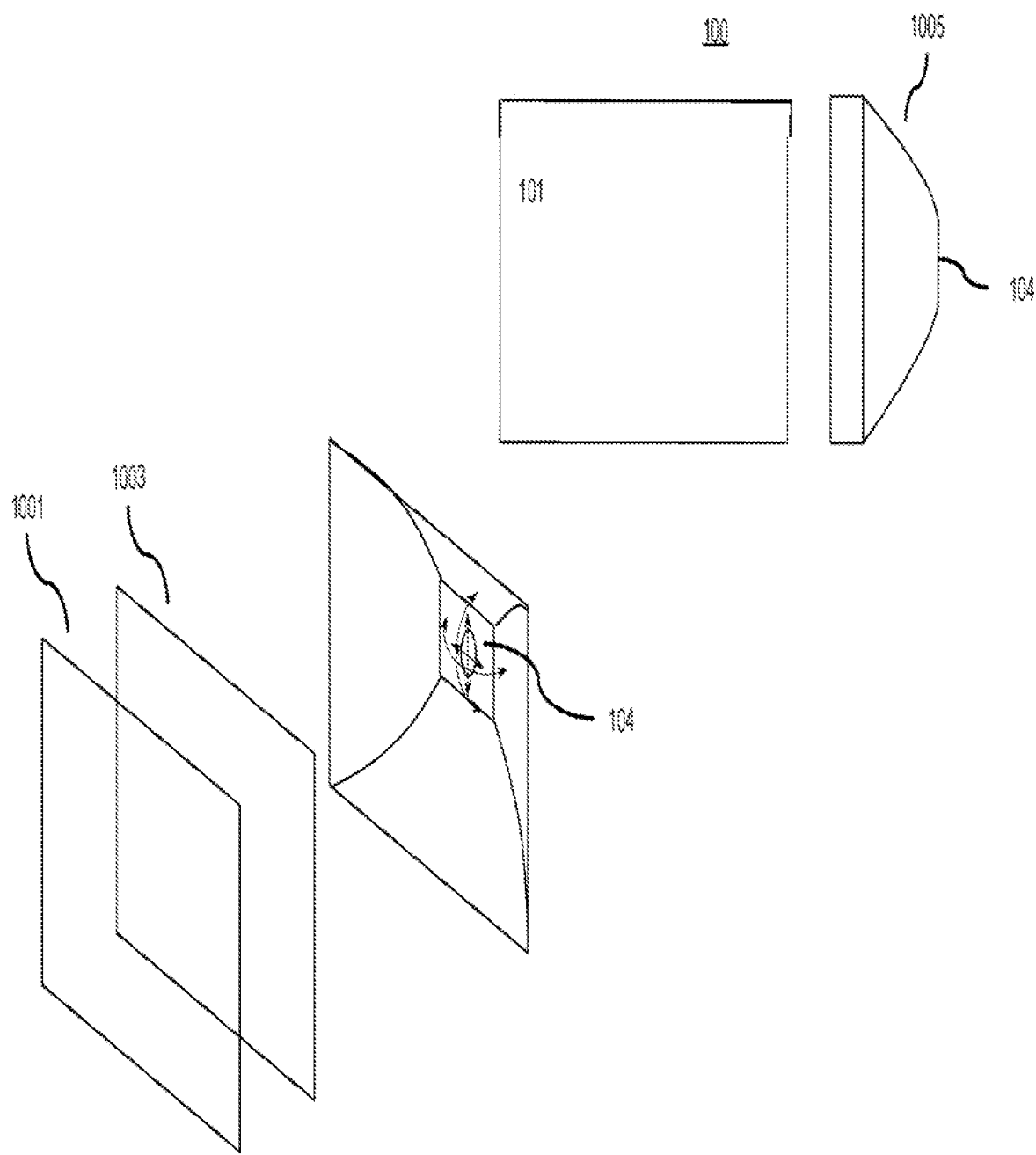
FIG. 11 illustrates an exemplary device for capturing board writing with an interactive display, according to an embodiment of the invention.

In an embodiment of the present invention and with reference to FIG. 11, the cover 1005 comprises any suitable material, for example, any rigid or semi-rigid material including, but not limited to, wood, plastic, metal, or any combination thereof. The cover 1005 can also be angled to act as a frame and shield light pollution from affecting the capturing of media content from the image capture device 104. The cover 1005 can also be flat with no angular shape. Meaning, it is pressed flat or matted against the display screen 101 that encompasses the OLED display and touch panel. The presentation device 100 utilizes specific types and delivery systems for light to enhance the viewer's or user's experience. In an embodiment of the invention, the cover 1005 comprises an embedded light source such as one or more LEDs to inject light into the display screen 101. The effect highlights dry-erase ink, preferably neon dry erase ink, deposited on the writing surface 101. The injected light may be in the visible spectrum or outside the visible spectrum, such as ultraviolet, i.e., blacklight or infrared. In another embodiment, the display screen 101 is one OLED display with a touch panel and light from the OLED display illuminates the dry-erase ink deposited on the writing surface 101. Thus, in this embodiment, the cover 1005 may not comprise LEDs.

In another exemplary embodiment of the present invention, the cover 1005 houses a computer that features a processor, memory, and computer program code. The computer housed within the cover 1005 runs software and computer program code that controls all of the interactions and functioning of the presentation device 100. The cover 1005 also can encompass the display screen 101 to act as a monitor where a control board or motherboard controls the presentation device's 100 features from the display screen 101. In addition, a keyboard is either wirelessly connected or wired to the presentation device 100 and controls the display screen's 101 functions. In some embodiments, cover 1005 has a predetermined depth to ensure that image capture device 104 captures the entire display screen 101 within its field of view. In an alternate embodiment, image device 104 may be disposed behind a writing surface 1001 and touch screen 1003 which collectively include the display screen 101.

Figure 12:
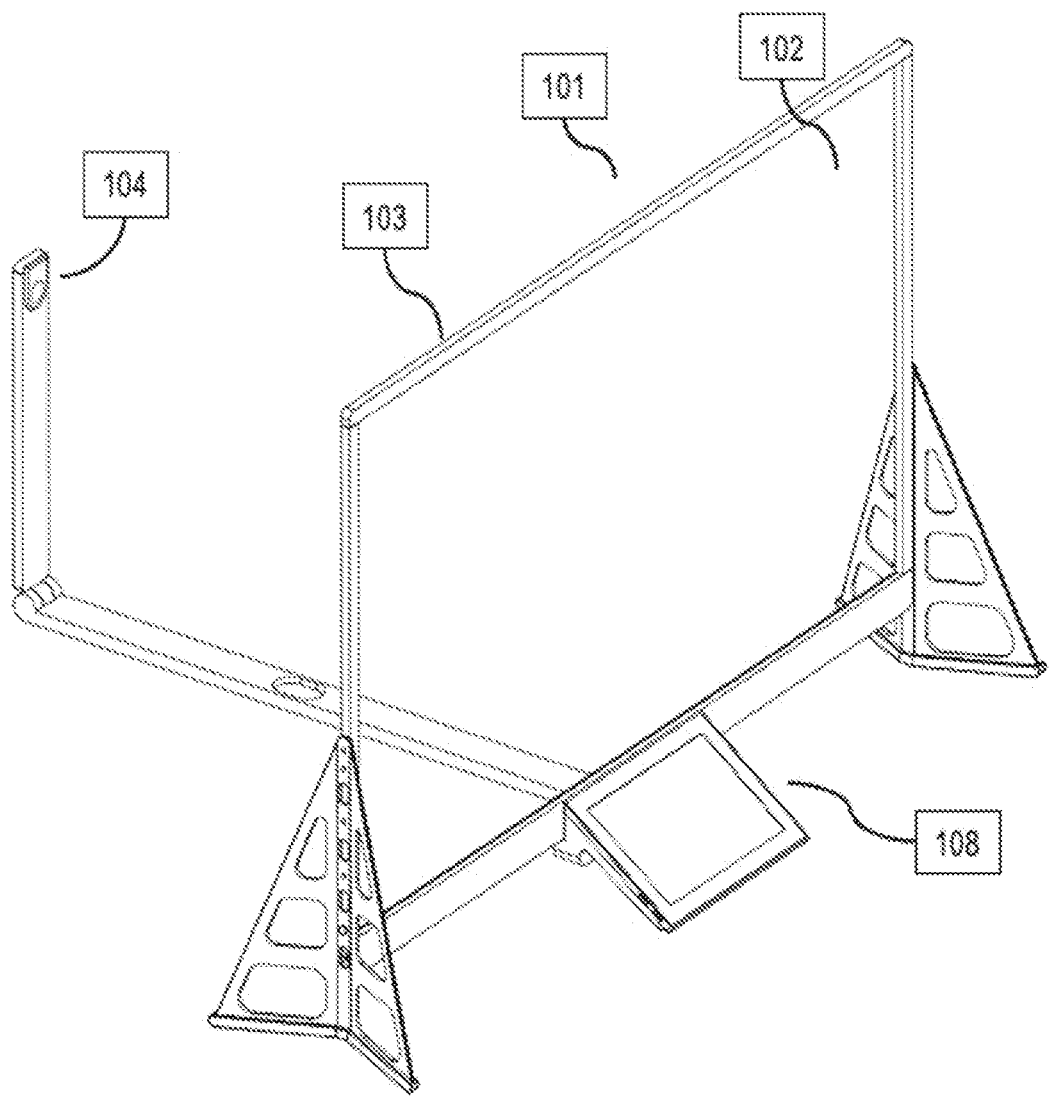
FIG. 12 illustrates illustrate an exemplary device for capturing board writing with an interactive display, according to an embodiment of the invention.

In another exemplary embodiment and with reference to FIG. 12, the presentation device 100 may comprise an interactive display 108. The display 108 may include a user interface that allows the user to control one or more aspects of the present invention. For example, the interactive display 108 can enable the user to view the video captured by the video camera 104 and adjust specific settings, for example, the exposure. The interactive display 108 may also allow a user to control light sources integrated into the frame 103.

In an embodiment of the invention, the display screen 101 comprises a transparent touch-sensitive interactive display, e.g., a transparent digital whiteboard. A user could write or draw in the touch-sensitive display 102 using his or her hand or a stylus, and those markings will be shown on the display 102 in real-time. In such an embodiment, the multimedia information captured by the video camera 104 can be processed independently of or in conjunction with the markings captured by the digital whiteboard 102. Additionally, in such an embodiment, the interactive display 108 can control one or more functions of the video camera 104.

In another exemplary embodiment, the image capture device 104 can be located lower relative to the display screen 101 than other embodiments, for example, as shown in FIGS. 1 and 1A. Here, an audience member would have an easier time viewing the presenter. However, in such an embodiment, additional processing may be required to correct perceived deformations in writings 201 caused by the lower aspect angle of the video camera's 104 lower relative position.

Figure 13:
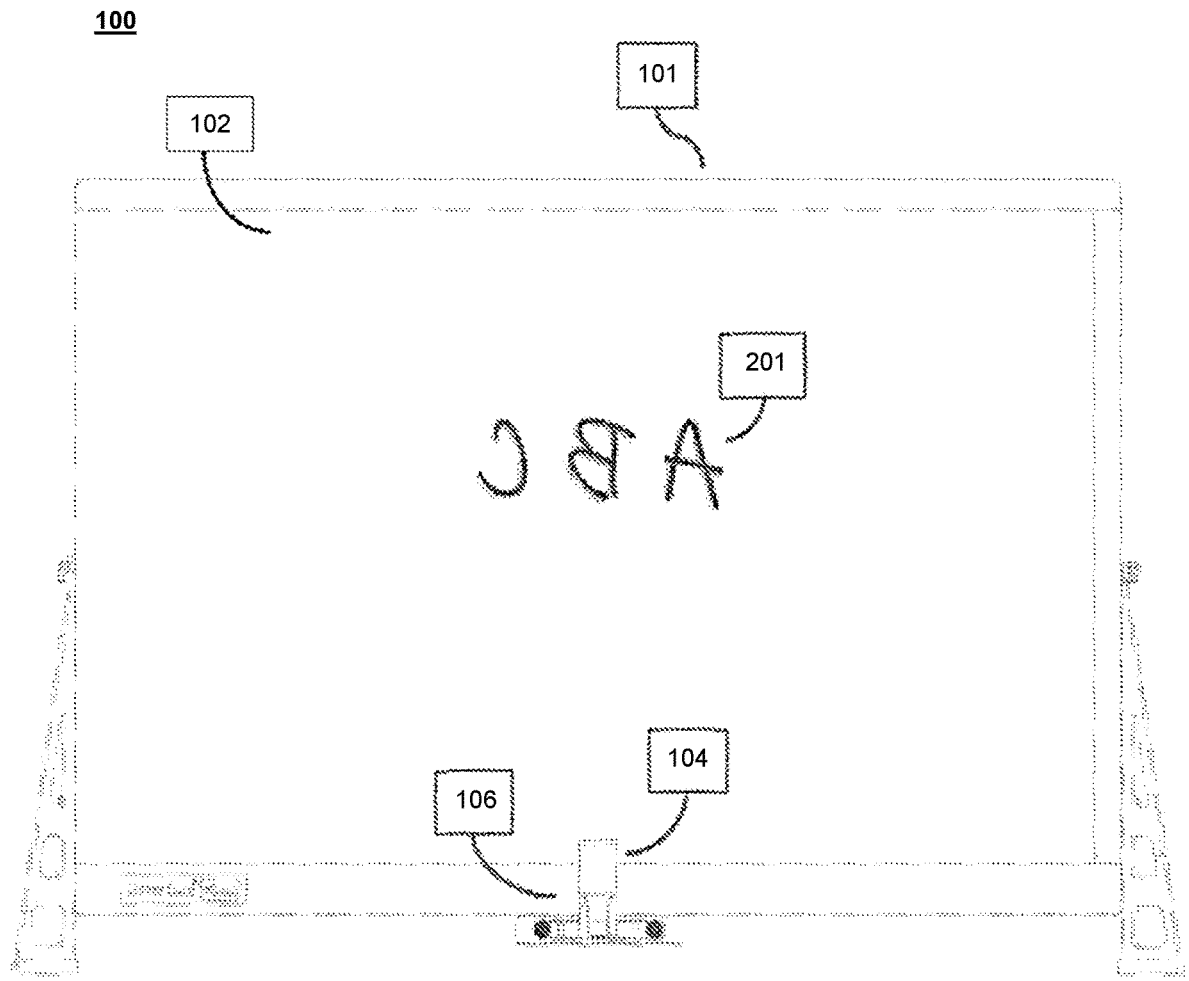
FIG. 13 illustrates illustrate an exemplary device for capturing board writing with an interactive display, according to an embodiment of the invention.

In another exemplary embodiment, and with reference to FIG. 13, the present invention provides an image capture device 104 embedded within a display screen. In an embodiment, for example, the image capture device 104 may be integrated into the display screen 101. In such an embodiment and as previously noted, the display screen 101 may have one or more video cameras embedded into the display 101 that are optimized for use with the display. In such a configuration, the user can look at the display screen, and it will appear as if the user is looking into the eyes of the person receiving the video stream. In said embodiment, the image capture 104 device may be located near or exactly at the center of the display screen 101.

The present invention also facilitates image insertion. In an embodiment of the invention, the video camera 104 or a computer coupled to it superimposes a computerized image or video onto the captured video. For example, a computerized image can be a double-stranded DNA molecule. The presenter sees the double-stranded DNA molecule on a separate confidence monitor, but not the writing surface 102.

With the confidence monitor's aid, the presenter can write or draw information on the writing surface 102 as if the double-stranded DNA molecule was present, thereby creating a captured video having both the information and the double-stranded DNA molecule.

Figure 14:
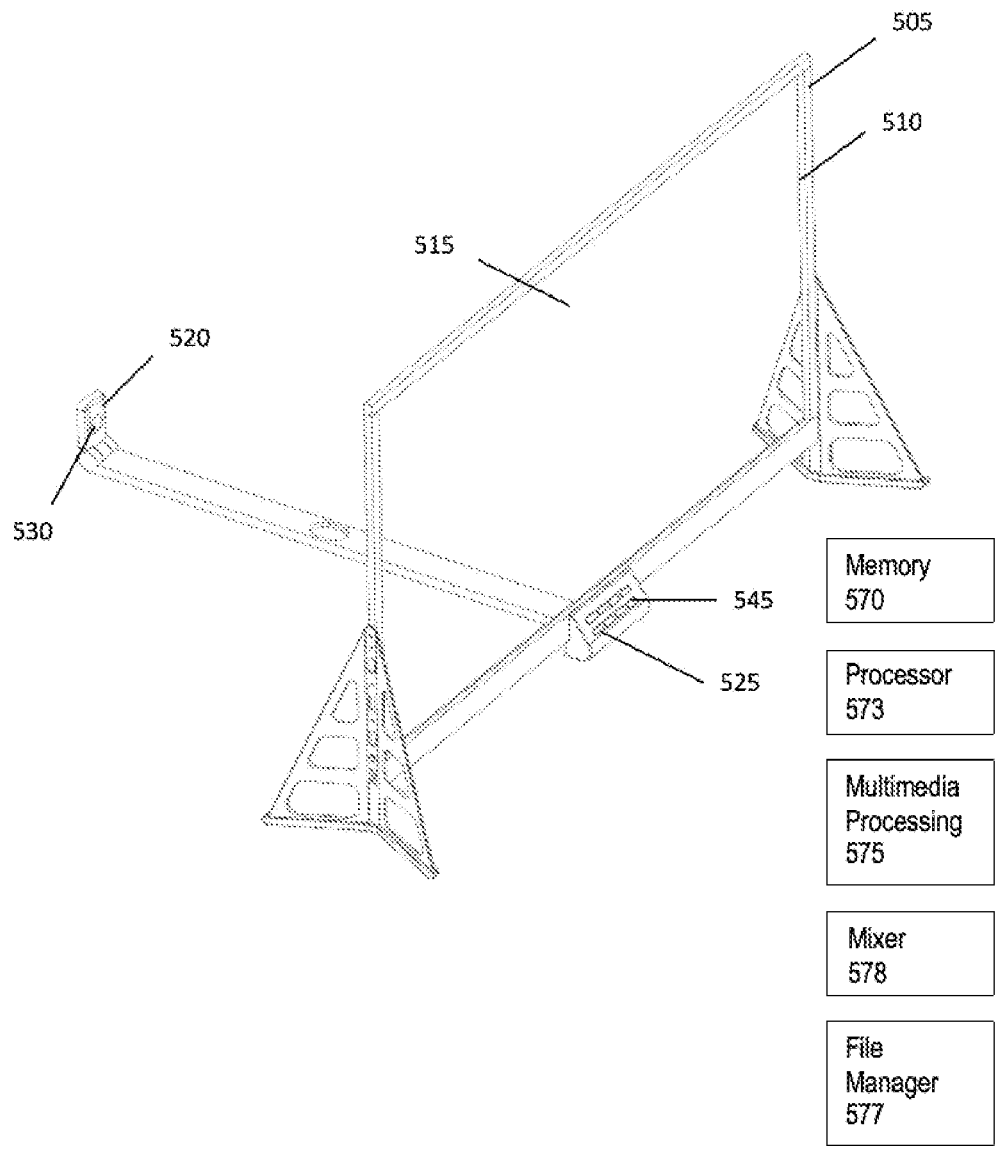
FIG. 14 illustrates an exemplary apparatus for controlling and colorizing visual information on an interactive display, according to an embodiment of the invention.

As shown in FIG. 14, a system 500 utilizes a light source 505 that injects colored light 510 into a display screen 515. The system 500 digitally creates a glowing writing effect on the display screen 515 to better capture an audience's attention. The colored light provides the three primary colors of red, green, blue, and a combination thereof. The combination of the red, green, and blue color hues are blended by a color blending instrument 545 to create any range of color combinations. For an unlimited range of colors and a color scale system, the implementation would be apparent to one of ordinary skill in the art. The system 500 implements a camera or video camera 520 that captures and records a user's writing on the display screen 515. Besides writing, the camera 520 also captures any visual information presented on the display screen 515, including 3D digital media content. A computer program 525 with specified code for the display screen 515 digitally filters 530 at the camera's image signal processor chip firmware. Alternatively, the computer program 525 with specified code for the display screen 515 digitally filters 530 at the computer program's 525 camera viewer application window to match a specific combination of colors. More specifically, the digital filtering 530 at the computer program 525 camera viewer application window occurs digitally at the application level. Camera viewer application window refers herein to a graphical user interface ("GUI") where a user can view a digitally filtered and altered/processed/rendered media content if desired. The camera view application window can appear as a window that may automatically re-sizes to a user's screen.

The system and display screen 515 houses circuitry to act as a computing device (for example, a computer) with common computer elements including a memory 570 and a processor 573. The system 500 can also alternatively connect and couple to a computing device. The memory 570 included in system 500 can be any form of storage medium including, but not limited to random access memory ("RAM"), read-only memory ("ROM"), erasable programmable read-only memory ("EPROM"), a cache, a hard drive, a flash drive, a removable disk, a Secure Digital card ("SD card"), cloud computing, registers, and/or memory buffer, or any combination thereof. The memory can be in communication with a processor 573 such that the processor 573 can read information from, and write information to, the memory 570. Further, the processor 573 can be any suitable processing device configured to run or execute a set of instructions or code, e.g., stored in the memory 570, such as a central processing unit ("CPU"), general purpose processor ("GPP"), a graphics processor unit ("GPU"), a digital signal processor ("DSP"), an application specific integrates circuit ("ASIC"), a field programmable gate array ("FPGA"), or any other programmable logic device, discrete gate or transistor logic, discrete hardware components, controller, microcontroller, or any combination thereof, designed to perform the functions described herein. For example, the processor 573 can be implemented as a combination of a DSP and a microprocessor, a plurality of microprocessors, one or more microprocessors in conjunction with a DSP core, or any other such configuration.

Further, digital filtering herein refers to the process or similar processes of eliminating color hues that match the injected light, blending/merging a new color hue to counter the injected color, or other similar color filtering processes. This digital filtering can be implemented as alpha channel color blending or adjusting the overall color hue, the implementation of which is apparent to one of ordinary skill in the art. Alpha channel color blending herein refers to the control of the transparency or opacity of colors. In addition, the color blending can occur automatically based on specified settings. For example, if a brighter exposure is desired, the color blending can increase the amount of brighter colored light injected. This automatic change occurs via a computer program with specified code to implement specific settings determined by a user, the implementation of which is apparent to one of ordinary skill in the art. Therefore, the system 500 eliminates the use of physical glass or plastic color filters or any other color filters used for pre-determined single color hues.

Moreover, the system 500 implements multimedia processing 575 which includes integrating multimedia information captured by image capture device 520 with multimedia information shown on display screen 515. In this way, system 500 provides a single video stream containing all visual elements, including the user, to provide the audience with a superior viewing experience. System 500 stores the multimedia information in a multimedia database in the memory 270, either before or after processing 275.

A file manager 577 additionally processes objects that are inputted. The file manager 577 processes objects by converting them into another format that allows the objects to be displayed. The file manager 577 additionally provides a user interface to manage files and folders. For example, the file manager 577 creates, open (e.g., view, play, edit, or print), rename, copy, move, delete, or search for files, as well as modifying file attributes, properties, and file permissions. The file manager 577 can cause the display folders or files in a hierarchical tree based on their directory structure. In some embodiments, the file manager 577 may move multiple files by copying and deleting each selected file from the source individually. In other embodiments, the file manager copies all selected files, then deletes them from the source. In other embodiments, the file manager 577 includes features similar to those of web browsers, e.g., forward and back navigational buttons. In other embodiments, the file manager provides network connectivity via protocols, such as FTP, HTTP, NFS, SMB, or WebDAV. In another embodiment, the file manager may provide a flattened and/or rasterized image. For example, multimedia objects often contain multiple layers of information, much of which is not be required to implement the features of the present invention. Flattening such an image reduces the overall size of the file by removing information relating to portions of the object that are not visible. The file manager 577 further includes and/or use temporary memory (e.g., RAM) in which data or information may be stored during the implementation of the features described herein.

In another embodiment of the present invention, once the multimedia information is processed, the multimedia information is outputted, to various devices. For example, the processed multimedia information can be sent to viewing devices. Such viewing devices may include televisions, monitors, computers, desktop computers, laptop computers, kiosks, smartphones, portable electronic devices, tablets, or any other device comprising a display screen. One or more of the viewing devices may communicate with other viewing devices through the communication network or directly, for example, via Bluetooth. In an embodiment utilizing built-in video conferencing, for example, the viewing devices may be associated with participants in the teleconference along with the user of presentation device 100. In embodiments implementing a confidence monitor, one or more of viewing devices may operate as or integrated into confidence monitor. A communication network may be the internet or any wired or wireless communication network, the identification and implementation of which are apparent to one of ordinary skill in the art.

In an embodiment of the present invention, the system's 500 color blending is achieved through a color blending instrument 545. The color blending can occur manually via knobs 545 on the display screen 515. There can be three knobs to represent the primary colors, where a user can rotate each knob to obtain a desired color combination. Moreover, the present invention is not limited to knobs 545, but the color blending instrument can be embedded into the display screen 515, a touch screen virtual knob or meter, or any other instruments to change the color combinations. For example, in a touch screen virtual color blending instrument 545 implementation, the color blending instrument 545 is controlled via a touch screen where a user can move a dial to determine the amount of color blending.

Furthermore, the color blending and filtering similarly process an image and multimedia information and optimize the content for its visual presentation. For example, the blending and filtering may perform adjustments pertaining to a captured image and injected light color, the color's intensity, brightness, and contrast. In this way, the blending and filtering processes maximize the visual experience by ensuring that information displayed on display screen 515 is optimized for the conditions under which it is displayed. In an example where the multimedia information is a picture, the filtering and blending may adjust the color, e.g., the picture's tint or hue, to ensure that it is displayed with visually correct colors when depicted on display screen 515. This ensures that the picture does not appear too green or yellow when displayed. In another example where the multimedia information comprises a presentation window, the blending and filtering will, for example, adjust and/or optimize the size, location, and/or opacity of the presentation window. The blending and filtering may also cause the presentation window to scroll or pan, incrementally or by skipping pages, either based on predetermined criteria or based on the user's input, e.g., a user using a mouse wheel or some other input/output device to scroll up or down. The blending and filtering can adjust the appearance of rich media objects by zooming, scaling, or inverting the colors displayed.

A mixer 578 additionally processes multimedia information by, for example, combining the already processed multimedia information with the video stream captured by the image capture device 520 into a single data stream. In an exemplary embodiment, the mixer 578 receives processed data from the blending and/or filtering processes and also receives data captured by image capture device 520. The mixer 578 combines the received data to generate a single video stream containing all desired visual elements. In an exemplary embodiment, the mixer 578 receives visual information received from the image capture device 520 and the multimedia information shown on display screen 515. For example, the mixer receives a video stream captured by video camera 520. The received video stream includes the user, any annotations the user has made and depicted on display 515, for example, writing and annotation. The received video stream may further include multimedia information and objects, shown on display screen 515, as captured by video capture device 520. The mixer 578 also receives the same multimedia information as filtered and/or blended. That is, the mixer receives duplicative information pertaining to multimedia objects. In this example, the visual information pertaining to the multimedia objects and filtered and/or blended are of higher quality and more visually appealing than the information pertaining to those objects captured by video camera 520. In such an example, the mixer 578, in combining the two streams, uses the information pertaining to the visually superior source, i.e., the mixer uses visual information relating to multimedia objects after blending and/or filtering and combines it with the visual information pertaining to the user and annotations as captured from the video camera 520. The resulting output is a single video stream containing only the appealing and highest quality visual information. The mixer may also ensure the image capture device 520 and display screen 515 are out of phase with one another to capture the user and information unrelated to images displayed on display screen 515.

In another embodiment, the image capture device 520 and/or display screen 515 are configured such that certain multimedia information shown on display screen 515 is not captured by image capture device 520. By way of example, a multimedia window is depicted on display screen 515 and is visible to the user. The image capture device 104 does not capture images of the multimedia window. In such an example, the mixer 578 combines the video stream captured by the video camera 520 and the visual information filtered and/or blended by, for example, superimposing one over the other. In this way, the mixer 578 generates a single video stream that contains the visual presentation elements.

Figure 15:
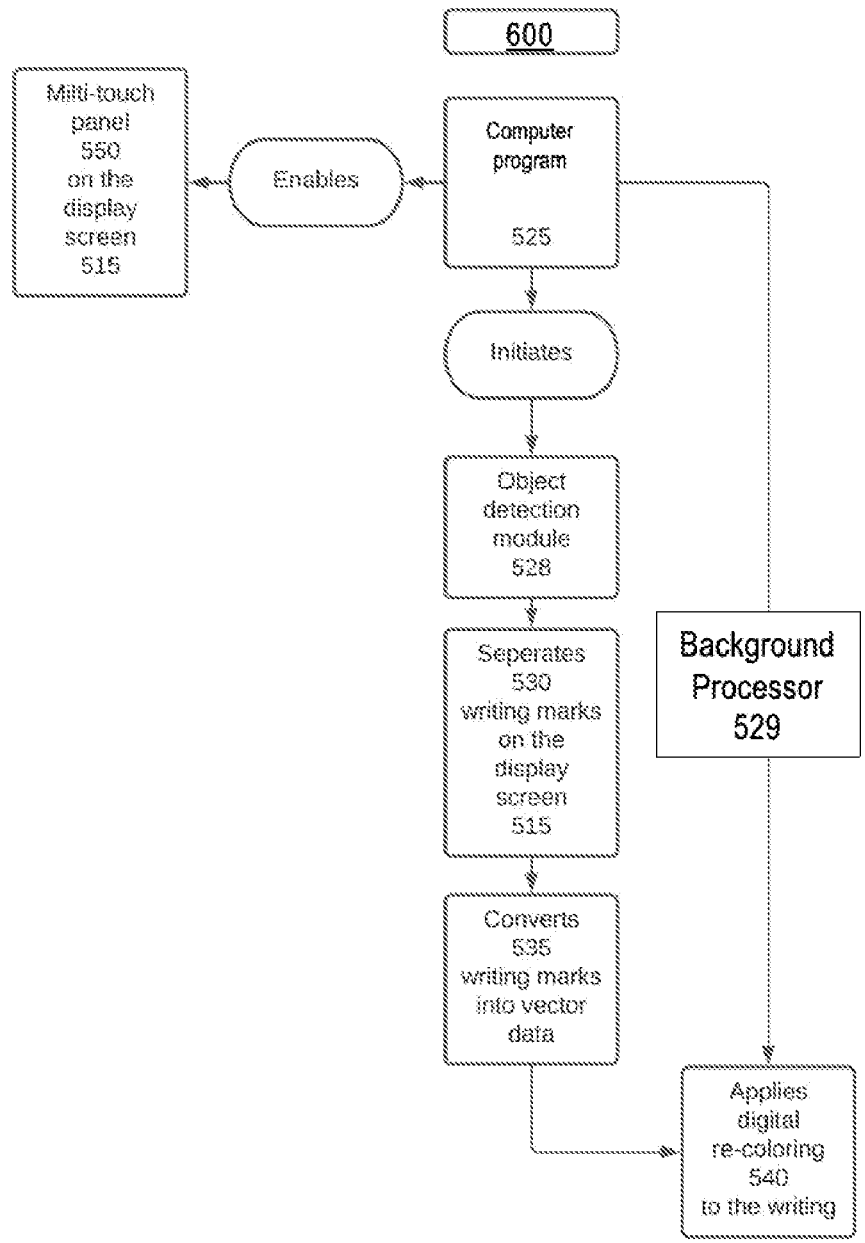
FIG. 15 illustrates an exemplary apparatus for controlling and colorizing visual information on an interactive display, according to an embodiment of the invention.

As shown in FIG. 15, the system 600 can enable a multi-touch or touchscreen panel 550 on the display screen 515. The multi-touch or touchscreen panel 550 is not limited to a touchscreen panel but also can be an interactive flat panel touch screen or similar mechanism. The touchscreen panel 550 provides a user with the option to employ digital glowing effects via their touch. A user can separate out writing using the touchscreen panel 550. While separating, a user's touch events can simultaneously be recorded as x and y coordinates or can be captured as multiple vectors in vector data format, the implementation of which is readily apparent to one of ordinary skill in the art. After the writing is captured, the writing can be digitally enhanced to glow via a computer program and corresponding code.

An optional image object recognition module and edge detection module is implemented, as shown in FIG. 15. After a user, teacher, or presenter writes on the display screen 515, a computer program 525 with specified code initiates an object detection module and commences an edge detection module 528. The object detection module scans multimedia information, also referred to as digital media content for objects. Meanwhile, the edge detection module scans the digital media content to determine the boundaries, which assists in the detection of an object, the implementation of which is apparent to one of ordinary skill in the art. Once an object is detected, it is stored on a timeline and registered in a database for later viewing or callback. The database can use the vector data and other digital media content data for future machine/AI learning purposes on a neural network. For example, the injected light can automatically turn a certain color under specified settings for specific presenters or at certain times.

The object detection and edge modules 528 detect and store vector data and are collectively referred to under reference numeral 528. The modules 528 are any assembly and/or set of operatively-coupled electrical components that can include, but is not limited to, a memory, a processor, software (executing in hardware), or the like. In some embodiments, the plurality of modules can be software modules or hardware modules stored in the memory and/or executed in the processor. In other embodiments, the plurality of modules can be any combination of hardware-based module, e.g., a FPGA, an ASIC, a DSP, and/or software-based module, e.g., a module of computer code stored in memory and/or executed at the processor, capable of performing one or more specific functions associated with that module.

Utilizing the techniques described herein, the system 600 captures writing marks as vector-based information and displays it has annotations on the presentation device's display screen 515. Because the vector-based information requires minimal bandwidth, the annotations are displayed in real time or near-real time as the user creates annotations on the multi-touch panel 550. In other embodiments, the display screen is a touch sensitive screen. In such embodiments, annotations created on the presentation device 830 are also displayed on the user device 820 in near real time. In other embodiments, the user can modify, amend, and/or delete pre-existing annotations and/or images either on the presentation device 830 or the user device 820.

The vector data comprises a plurality of parameters. In an exemplary embodiment, the vector data comprises position (x,y), thickness, and color parameters. These three parameters aid in the representation of writings and drawings. In other embodiments, the vector data comprises positional information for a three-dimensional space, e.g., (x, y, z) coordinates. In other embodiments, the vector data comprises information for a four-dimensional space, e.g., (x, y, z, time). While not listed herein, the vector data can feature other information that would be apparent to one of ordinary skill in the art.

Additionally, the object detection module and edge detection module 528 separate 530 the writing marks on the display screen 515. The writing marks are converted 535 into vector data, where a computer program 525 applies a digital re-coloring 540 to the writing.

A background processor 529 may be implemented to remove unwanted or unnecessary visual information, e.g., the background, from a multimedia object at step 530. In an exemplary embodiment, a user may wish to input a photo or picture. The background processor 529 will then detect and remove information that is visually insignificant, e.g., remove the whitespace or background from the photo or picture or change colors. In some embodiments, the user can specify what areas of the photo or picture are removed by, for example, selecting the unwanted portions. Once specified, a background processing module 529 removes the unwanted portions of the photo or picture, the implementation of which will be understood by one skilled in the art. In this way, the background processing module 529 removes information from multimedia objects that has the added benefits of requiring less space for storage and transmission, thereby reducing latency. Additionally, removing unwanted portions of a multimedia object enhances the audience's viewing experience by omitting irrelevant information.

In another embodiment, the background processor 529 provides the effect of removing the background by creating a new multimedia object based on the inputted multimedia object with characteristics and/or attributes that are more conducive to implementing the features described herein. For example, a user may input a digital photo to be depicted on display 515. In this example, the inputted digital photo has a very high resolution that is desired to increase the presentation experience. However, such a file will be large and will require a large amount of storage space, bandwidth, and processing power to store, transfer, and manipulate. Instead of excising the unwanted portions of the digital photo, the background processing module 529, at step 530, may, for example, create an image vector map based on the inputted digital photo, the implementation of which will be apparent to one skilled in the art. The resulting vector map image will take less space, require fewer computing resources to manipulate, and require less bandwidth to transfer while maintaining the visual experience of the high resolution inputted digital photo. Additionally, in creating such a vector map image, the background processing module can remove the unwanted portions of the image background of the image.

The display screen 515 displays multimedia or other information by incorporating, for example, a digital display, e.g., an LCD or OLED display. Some embodiments further include a touch-sensitive 550 display that may be optionally integrated into display screen 515. In such an embodiment, the user may display a multimedia window on display screen 515, including multimedia objects, and photo and/or video objects. Multimedia objects further include, but are not limited to, pictures, photographs, videos, video materials, digital renderings, audio files, text, animations, and data/information associated therewith.

In some embodiments, the display screen 515 comprises a touch-sensitive panel 550. Exemplary touch-sensitive panels 550 comprise an infrared or capacitive touch panel. The display screen 515 may also comprise digital display embodied by, for example, an LCD or OLED display. The user can also annotate or interact with one or more objects displayed using a multimedia window. For example, the user can underline text with an annotation. The multimedia objects can also provide various control parameters in the form of a user interface. The control parameters include annotation controls, which allow the user to, for example, control the display characteristics of annotation. Control parameters include objects that allow the user to choose the type and/or source of the multimedia displayed in the multimedia window. Control objects may be selected to enable the user to display and interact with a PowerPoint presentation in multimedia window or at another location on display screen 515. Control objects allow the user to select an image/video file displayed within multimedia window or at another location on display screen 515. Control objects allow the user to choose a web page (e.g., HTML file/link) displayed within multimedia window or at another location on display screen 515. Control objects allows the user to select/deselect one or more objects stored in memory (i.e., a digital clipboard containing, for example, XPS content) to be displayed in the multimedia window or at another location on display screen 515.

The multimedia information further includes graphical objects such as, for example, a square and a triangle. In some embodiments, the graphical objects (i.e., square and triangle) may be embedded within the information related to multimedia window, such as, for example, by being embedded within HTML code pertaining to multimedia window. In other embodiments, graphical objects maybe not be embedded within the information associated with graphical window but instead displayed by one or more other components of the system 600. For example, a user may draw a graphical object as a square and/or triangle. System 600 recognizes the graphical object, stores it as an object, and displays it on display screen 515, which the user can manipulate.

The system 600 recognizes that the user has drawn a graphical object as a triangle or square and output a corresponding geometrically correct graphical object. In such an example, a user hand-draws a square on the writing surface of the display screen 515. The user's drawing closely represents a square and the system 600 will, in turn, display a geometrically correct square that approximates the hand-drawn version. This drawing-to-figure or writing-to-text conversion will be understood by one skilled in the art.

Figure 16:
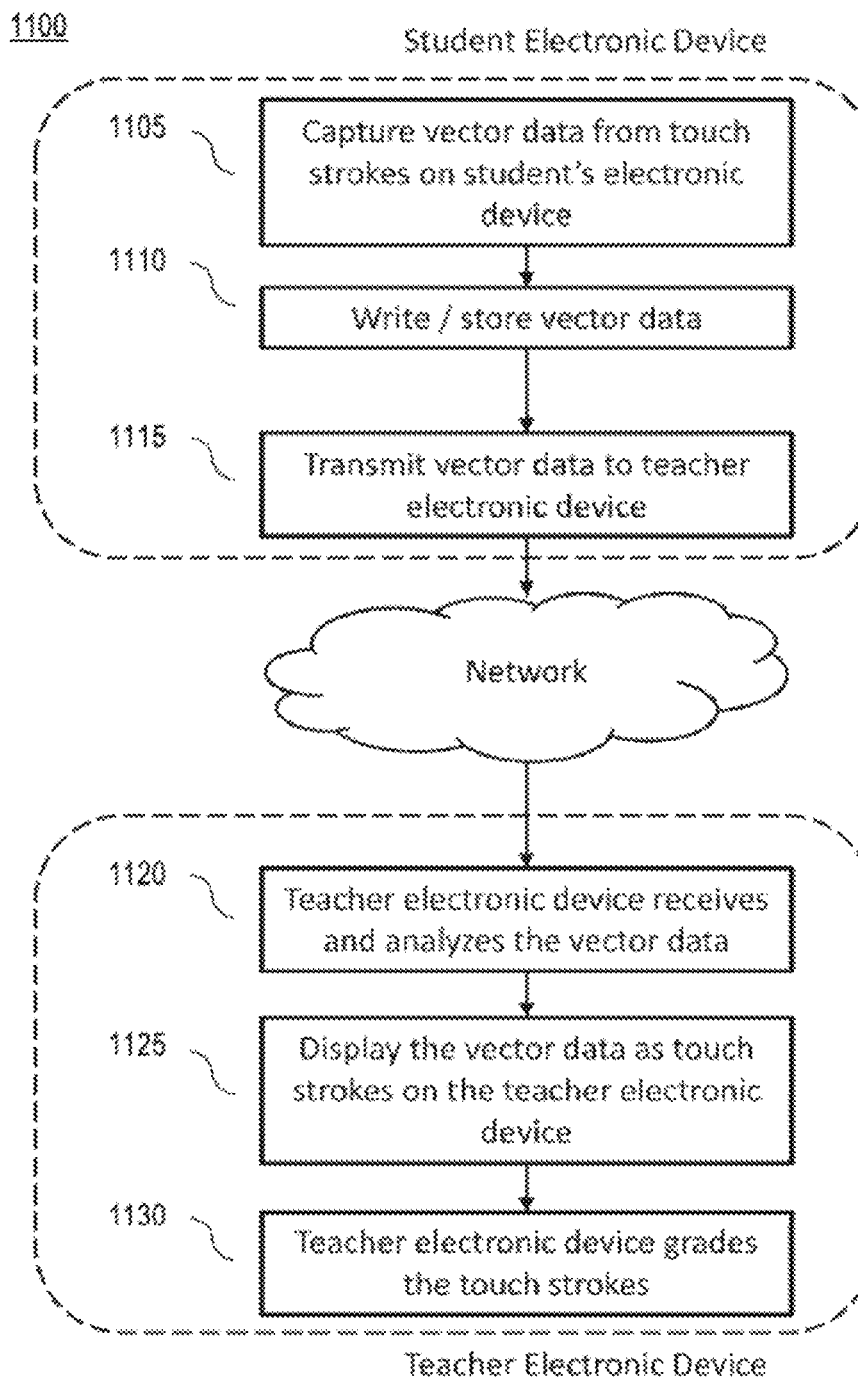
FIG. 16 illustrates an exemplary system for capturing board writing, according to an embodiment of the invention.

In another exemplary embodiment of the present disclosure and with reference to FIG. 16, the system comprises a host device, which further comprises a plurality of modules. The plurality of modules comprise any assembly and/or set of operatively-coupled electrical components that can include, but is not limited to, a memory, a processor, software (executing in hardware), or the like. In some embodiments, the plurality of modules can be software modules or hardware modules stored in the memory and/or executed in the processor. In other embodiments, the plurality of modules can be any combination of hardware-based module, e.g., a FPGA, an ASIC, a DSP, and/or software-based module, e.g., a module of computer code stored in memory and/or executed at the processor, capable of performing one or more specific functions associated with that module.

The host device comprises a content capture module, vectorization module, transmit module, receive module, imaging module, grading module, and handwriting recognition module. In some embodiments, the content capture module extracts image data from an image or input. The vectorization module translates, identifies, and/or extracts vector data from the image data, and can be further configured to generate a vector map from an image, series of images, a video stream, a plurality of video frames, or gestures. The transmit module may be configured to transmit the vector data and/or vector map to another electronic device. The receive module receives information such as vector data received from another electronic device. The imaging module generates displayable image or video information from vector data. The grading module analyzes the image and/or input for correctness as appropriate for a given application or situation. The handwriting recognition module analyzes an image, video, and/or input for handwriting. The handwriting recognition module then identifies and/or extracts the vector map for the handwriting data which may then be displayed on UI. The vector map can also be displayed in other forms, such as printed text. The host device is in communication with a memory and user interface ("UI") via a network.

With reference to FIG. 16, the method 1100 illustrates a student electronic device capturing, storing, and transmitting vector data to a teacher electronic device over a network. In such an embodiment, the method 1100 comprises, at step 1105, capturing vector data from touch strokes on a student's electronic device, such as those made on a touch-sensitive screen. In other embodiments, the vector data may be captured from another type of input device such as, but not limited to, a mouse, touchpad, graphics tablet, drawing tablet, LCD writing tablet, digital pen, finger stroke, hand gesture, and/or gesture remote control. At 1110, the vector data stored on a storage device such as RAM, ROM, or hard drive. At step 1115, the stored vector data is transferred to the teacher's electronic device over a network. In some embodiments, the student device transfers information directly to the teacher device by, for example, a peer-to-peer connection. At step 1120, the teacher's electronic device receives and analyzes the transferred vector data. This may include utilizing an authentication protocol for verifying the vector data's authenticity and/or source. At step 1125, the teacher's electronic device displays the vectors as the touch strokes inputted to the student electronic device by the student. At step 1130, the teacher's electronic device grades the touch strokes. In further embodiments, the grading may occur instantly upon receiving the vector data. In other embodiments, the grading may occur at a later time, such as at the end of an examination time period. In such an exemplary embodiment, the environment in which the system operates is a school classroom. Other exemplary environments utilizing such embodiments of the present disclosure may include lecture halls, conference rooms, online testing, homework submission, webinars, tourist kiosks, and/or ATMs.

Figure 17:
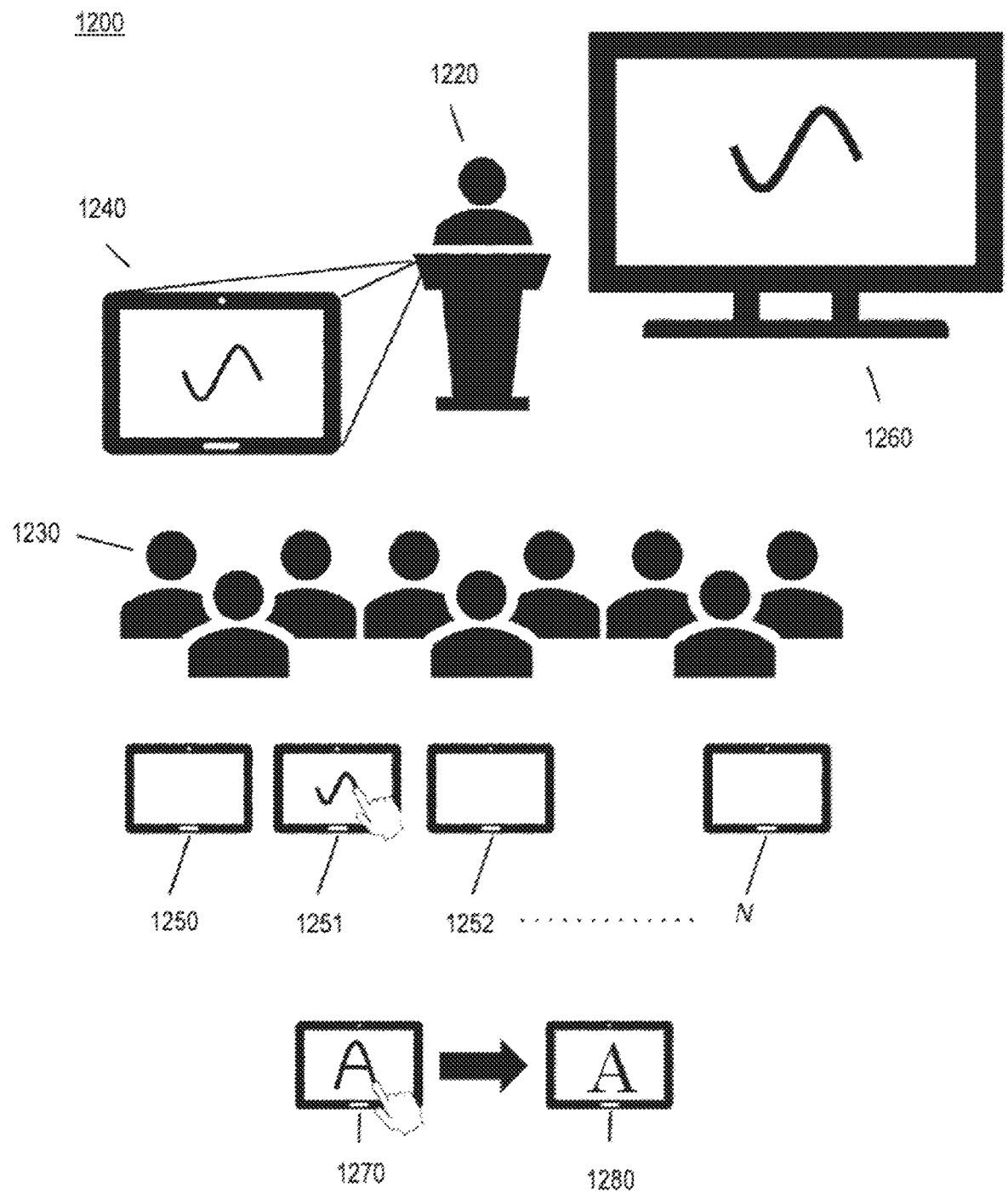
FIG. 17 illustrates an exemplary system for capturing board writing, according to an embodiment of the invention.

In another exemplary embodiment and with reference to FIG. 17, the system 1200 comprises a grading module capable of recognizing which of the plurality of students 1230 has entered a correct answer. In such an embodiment, the instructor 1220 specifies a correct answer using the instructor device 1240. Alternatively, the correct answer may already be predetermined and stored in the system 1200. The system then automatically displays the student devices N displaying the correct answer. The instructor 1220 can then select one or more of the correct answers to be displayed on the instructor device 1240, the presentation device 1260, and/or one or more of the student devices N.

The grading module may be configured to analyze the vector data and/or the image, such a number, word, letter, and/or shape, e.g., a circle around a correct answer. The grading module then determines if the student's answer is correct. In another embodiment, the grading module operates in conjunction with, or is comprised of, a handwriting recognition module. In such exemplary embodiments, the grading module comprises threshold protocols establishing thresholds for various grading parameters. Additionally, the threshold and grading protocols may be dynamically adjusted over time to ensure that the level of challenge given to the student is optimal based on that student's ability.

A vector-based content sharing system can be used in a classroom setting as described above. In such an embodiment, an instructor 1220 uses an instructor device 1240. Each of a plurality of students 1230 have a student device 1 . . . N. Additionally, a presentation device 1260 can be placed at a location visible to the plurality of students 1230. In some embodiments, the instructor device 1240 can access each of the N student devices. In an exemplary embodiment, the instructor 1220 queries the plurality of students 1230 for a specific response. Each of the plurality of students 1230 are able to enter their responses on their individual student device N. The instructor 1220 can then view each student response using the instructor device 1240. The instructor 1220 can select a particular response to view on the instructor device 1240 as is displayed on the selected student device 1251, 1252 . . . N. The instructor 1220 may then optionally display the selected response on the presentation device 1260. In other embodiments, the instructor 1220 can select a response to display on some or all of the N student devices. In other embodiments, the presentation device 1260 comprises a touch screen and, in such an embodiment, annotations placed on the presentation device 1260 can be captured and sent to the instructor device 1240 and any one or all of the N student devices. In other exemplary embodiments, the instructor device 1240, the student devices N, and/or the presentation device 1260 are configured to display an image or video that can be manipulated and/or annotated by any of the devices.

The system 1200 derives characters from annotations entered at one of the computing devices shown. In such an embodiment, a user can use the touch screen of device 1270 to manually draw out the letter "A" and a stored representation of "A" is displayed on device 1280. Based on the vector mapping information generated as a result of the annotations, the system can recognize that the user is writing the letter "A." In some embodiments, the system displays a predetermined representation of the letter "A" instead of displaying the annotation drawn by the user. Alternatively, the system can store the letter "A" rather than or in addition to storing vector map associated with the user's hand-drawn letter.

In another exemplary embodiment, the system 1200 stores vector data in a file and registers the device's identifying information from the device associated with the vector data, e.g., a teacher's electronic device 1240 and/or a student's electronic device 1250. The system further comprises a processor configured to store the vector data and device identification in a database on a cloud server. The cloud server may then associate the vector data with the originating device and with a time stamp on a master or individual timeline axis.

While the invention has been described in connection with a number of embodiments and implementations, the invention is not so limited but covers various apparent modifications and equivalent arrangements, which fall within the purview of the appended claims. Although features of the invention are expressed in certain combinations among the claims, it is contemplated that these features can be arranged in any combination and order. The invention has been described herein using specific embodiments for illustrative purposes only. It will be readily apparent to one of ordinary skill in the art, however, that the principles of the invention can be embodied in other ways. Therefore, the invention should not be regarded as limited in scope to the specific embodiments disclosed herein; it should be fully commensurate in scope with the following claims.

We claim:

1. A device comprising:
    a display screen;
    a frame traversing at least a portion of a perimeter of the display screen comprising a light source injecting light into an edge of the display screen;
    a color blending instrument;
    an extension comprising a distal end and a proximal end, wherein the proximal end of the extension is connected to the frame;
    a video camera coupled to the extension;
    at least one processor; and
    at least one memory including a computer program code for one or more computer programs, the at least one memory and the computer program code configured to, with the at least one processor, cause the device to perform at least the following:
    control the operation of the light source, the injected light, and colors of injected light.

2. The device of claim 1, wherein the injected light comprises the color hues of red, green, blue, and a combination thereof.

3. The device of claim 1, wherein the color blending instrument is selected from a group consisting of: physical knobs, physical switches, touch screen knobs, virtual knobs, virtual meters, or a combination thereof.

4. The device of claim 1, wherein the color blending instrument blends the injected light colors of red, green, blue, and a combination thereof produced from the light source.

5. The device of claim 1, wherein the computer program code digitally filters the injected light at the video camera's image signal processor chip firmware.

6. The device of claim 1, wherein the computer program code digitally filters the injected light at a camera viewer application.

7. An apparatus comprising:
    a display screen;
    a frame traversing at least a portion of a perimeter of the display screen;
    a color blending instrument;
    an extension connected to the frame;
    a video camera coupled to the extension;
    a light source injecting light into an edge of the display screen;
    at least one processor; and
    at least one memory including a computer program code for one or more computer programs, the at least one memory and the computer program code configured to, with the at least one processor, cause the apparatus to perform at least the following:
    capturing, with the video camera, information presented on the display screen;
    blending colors of injected light from the light source;
    processing the captured information; and
    transmitting the processed information to a display.

8. The apparatus of claim 7, wherein the extension is connected to the frame at a proximal end of the extension, and wherein the video camera is coupled to a distal end of the extension, the distal end is located opposite the proximal end.

9. The apparatus of claim 7, wherein the light source injects a colored light.

10. The apparatus of claim 7, wherein the light source produces color hues of red, green, blue, and a combination thereof.

11. The apparatus of claim 7, wherein the color blending instrument combines the injected light comprising the colors of red, green, and blue from the light source.

12. The apparatus of claim 7, wherein the color blending instrument is selected from a group consisting of: physical knobs, physical switches, touch screen knobs, virtual knobs, virtual meters, and a combination thereof.

13. The apparatus of claim 7, wherein the display screen comprises a first surface and a second surface opposite the first surface, the extension extends from the second surface, and the video camera is oriented in a direction toward the second surface.

14. The apparatus of claim 7, wherein the display screen is transparent and comprises a material selected from the group consisting of: glass, acrylic, plexiglass, polycarbonate, cellophane, latex, polyurethane, melamine, vinyl, polyester, and any combination thereof.

15. A method for controlling and blending colored injected light on a display screen, the method comprising the steps of:
    injecting light into an edge of a transparent display screen via a light source;
    capturing multimedia information at a camera's image signal processor chip firmware;
    digitally filtering multimedia information at the camera's image signal processor chip firmware; and
    blending a range of colors produced from the light source via a color blending instrument.

16. The method of claim 15, further comprising:
    an optional edge detection module;

an optional object recognition module, wherein the optional object recognition module and the optional edge detection module further comprise the steps of: separating visual information written on a display; converting the visual information into vector data; and applying a digital re-colorization to the visual information.

17. The method of claim 15, wherein the step of digitally filtering at the camera's image signal processor chip firmware further comprises filtering a frame of images captured by the video camera.

18. The method of claim 15, wherein the step of digitally filtering optionally occurs in a camera viewer application.

* * * * *